United States Patent
Madathilparambil George et al.

(10) Patent No.: US 10,841,227 B2
(45) Date of Patent: *Nov. 17, 2020

(54) NETWORK CONGESTION AND PACKET REORDERING

(71) Applicants: George Madathilparambil George, Bangalore (IN); Susan George, Bangalore (IN); Mammen Thomas, Hercules, CA (US)

(72) Inventors: George Madathilparambil George, Bangalore (IN); Susan George, Bangalore (IN); Mammen Thomas, Hercules, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/132,427

(22) Filed: Sep. 16, 2018

(65) Prior Publication Data

US 2019/0020592 A1    Jan. 17, 2019

Related U.S. Application Data

(60) Continuation of application No. 15/268,729, filed on Sep. 19, 2016, now Pat. No. 10,110,498, which is a division of application No. 14/120,845, filed on Jul. 1, 2014, now Pat. No. 9,479,442, which is a continuation of application No. 13/385,155, filed on (Continued)

(51) Int. Cl.
*H04L 12/851* (2013.01)
*H04L 29/08* (2006.01)
*H04L 12/803* (2013.01)
*H04L 12/947* (2013.01)
*G06F 13/40* (2006.01)
*G06F 13/42* (2006.01)
*H04L 12/741* (2013.01)

(52) U.S. Cl.
CPC .......... *H04L 47/24* (2013.01); *G06F 13/4022* (2013.01); *G06F 13/4282* (2013.01); *H04L 45/74* (2013.01); *H04L 47/125* (2013.01); *H04L 49/25* (2013.01); *H04L 69/32* (2013.01); *H04L 69/324* (2013.01)

(58) Field of Classification Search
CPC . H04L 45/00; H04L 61/2007; H04L 63/0428; H04L 45/24; H04L 45/28
See application file for complete search history.

(56) References Cited

U.S. PATENT DOCUMENTS

| | | | |
|---|---|---|---|
| 2006/0165090 A1* | 7/2006 | Kalliola | H04L 29/06 370/395.21 |
| 2006/0167975 A1* | 7/2006 | Chan | H04L 67/2819 709/203 |
| 2010/0118884 A1* | 5/2010 | Hendel | G06F 15/17375 370/412 |

* cited by examiner

*Primary Examiner* — Jung H Park

(57) ABSTRACT

Datalink frames or networking packets contain protocol information in the header and optionally in the trailer of a frame or a packet. We are proposing a method in which part of or all of the protocol information corresponding to a frame or a packet is transmitted separately in another datalink frame. The "Separately Transmitted Protocol Information" is referred to as STPI. The STPI contains enough protocol information to identify the next hop node or port. STPI can be used avoid network congestion and improve link efficiency. Preferably, there will be one datalink frame or network packet corresponding to each STPI, containing the data and the rest of the protocol information and this frame/packet is referred to as DFoNP. The creation of STPI and DFoNP is done by the originator of the frame or packet such as an operating system.

20 Claims, 39 Drawing Sheets

Related U.S. Application Data

Feb. 6, 2012, now Pat. No. 8,811,400, which is a continuation of application No. 11/505,788, filed on Aug. 18, 2006, now Pat. No. 8,139,574.

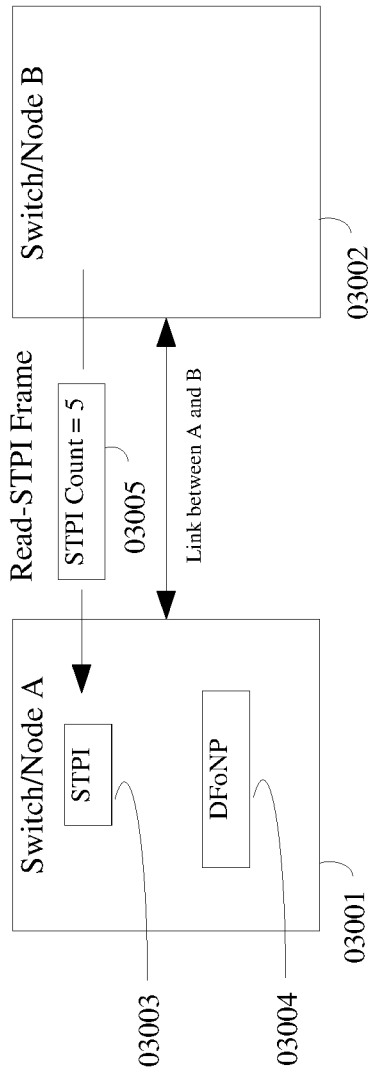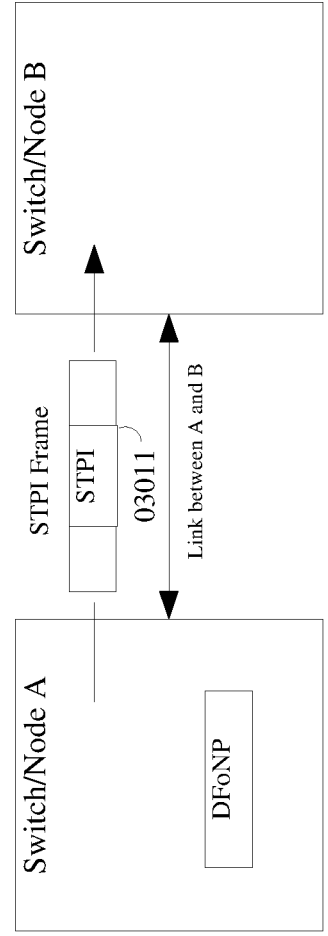
FIG. 3A
FIG. 3B

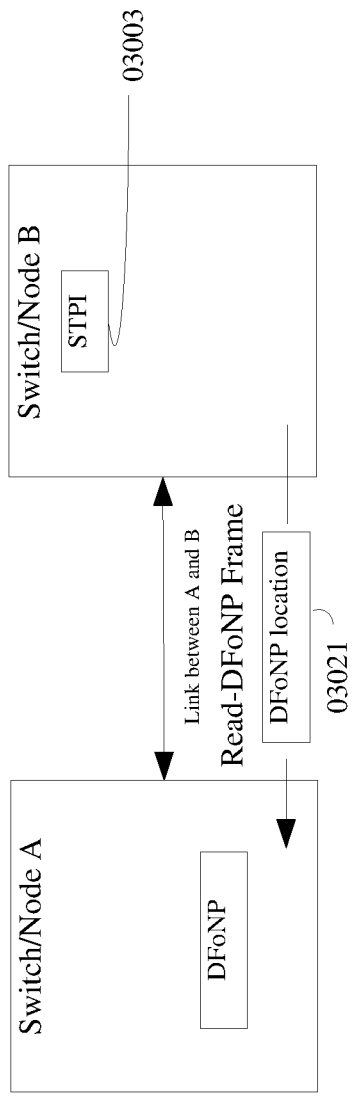
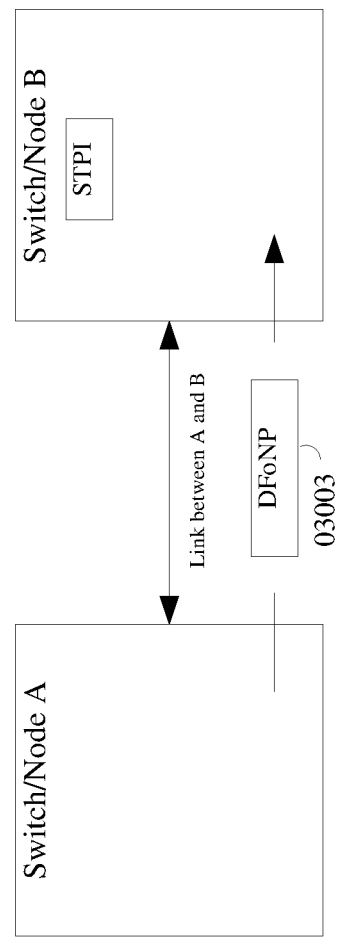
FIG. 3C
FIG. 3D

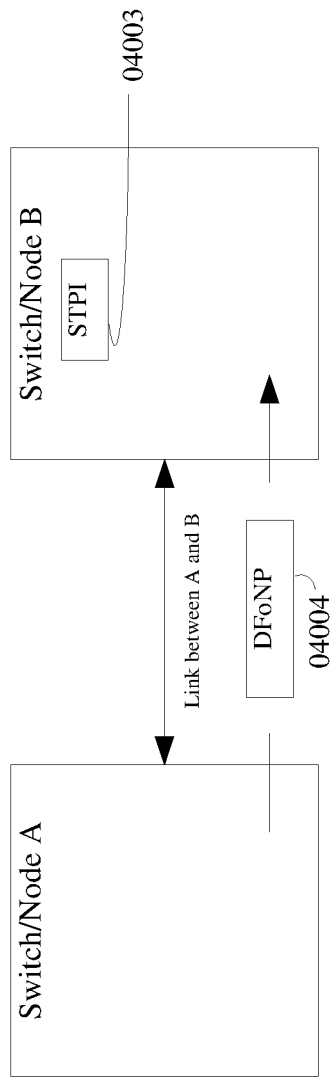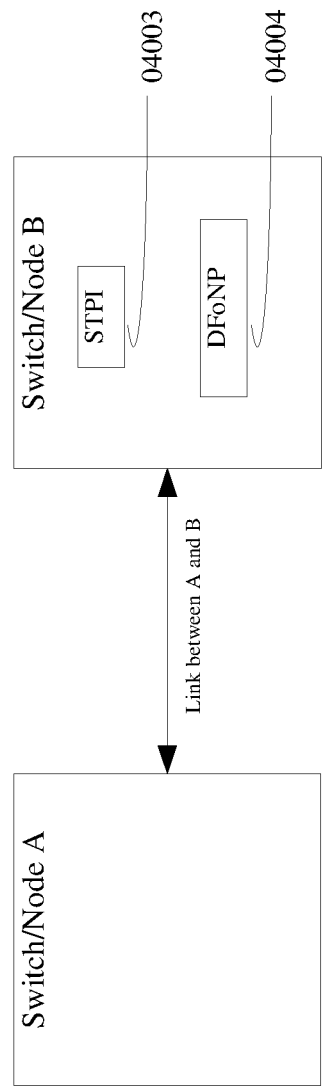
FIG. 4C
FIG. 4D

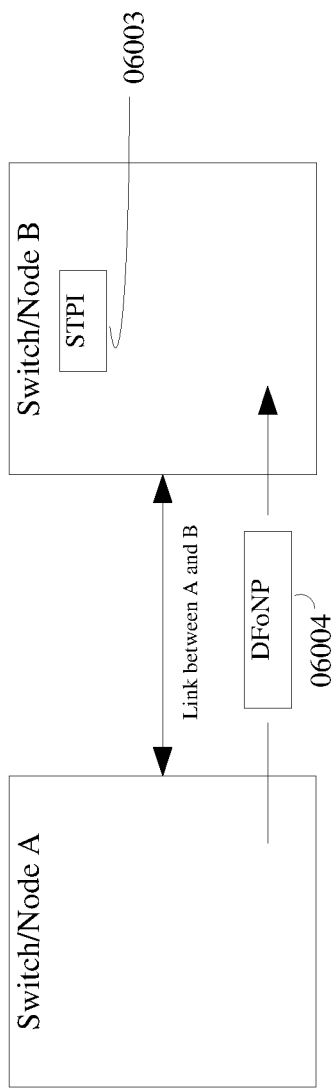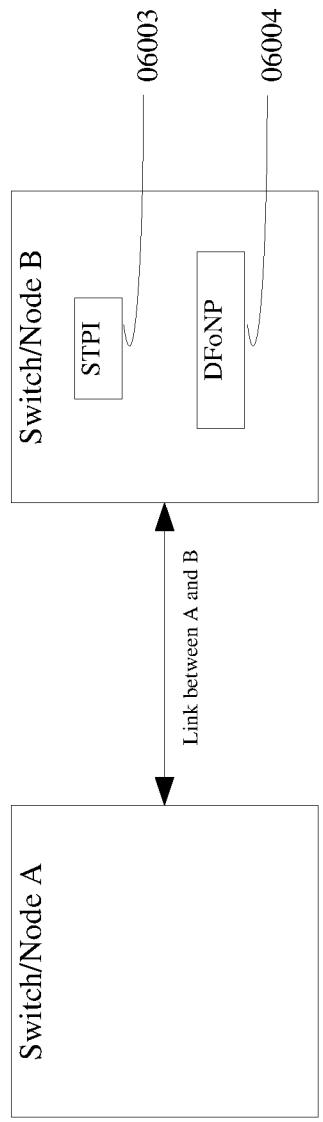
FIG. 6C
FIG. 6D

FIG. 12A

| Start – 8 bits | Sequence number – 16 bits | Reserved – 1 bit | Fmt – 2 bits = 10 | Type – 5 bits = 01010 | Reserved – 1 bit | TC – 3 bits | Reserved – 4 bits | TD – 1 bit = 1 |
|---|---|---|---|---|---|---|---|---|
| EP – 1 bit | Attr – 2 bits = from Memory Read Request | Reserved – 2 bits | Length – 10 bits | Completor ID – 16 bits = ID of the root bridge | Compleion Status – 3 bits | BCM – 1 bit | Byte Count = remaining byte count – 12 bits | Requestor ID – ID of the node reading DFoNP |
| Tag – 8 bits from Memory Read Request | Reserved – 1 bit | Lower Address – 7 bits | Frame Type = DFoNP | Layer 3/4 Protocol Information | Data | | ECRC | LCRC – 32 bits | End – 8 bits |

| Start – 8 bits | Sequence number – 16 bits | Reserved – 1 bit | Fmt – 2 bits = 10 | Type – 5 bits = 01010 | Reserved – 1 bit | TC – 3 bits | Reserved – 4 bits | TD – 1 bit = 1 |
|---|---|---|---|---|---|---|---|---|
| EP – 1 bit | Attr – 2 bits = from Memory Read Request | Reserved – 2 bits | Length – 10 bits = DFoNP size in DW | Completor ID – 16 bits = ID of the root bridge | Compleion Status – 3 bits | BCM – 1 bit | Byte Count = remaining byte count – 12 bits | Requestor ID – ID of the node reading DFoNP |
| Tag – 8 bits from Memory Read Request | Reserved – 1 bit | Lower Address – 7 bits | Frame Type = STPIs | Number of STPIs = 3 | STPI[1], STPI[2], STPI[3] | | ECRC | LCRC – 32 bits | End – 8 bits |

12011  12012  12013

Expanded view of STPI[2]

| Final Destination Node Identifier | Source Node Identifier | Destination STPI Address | Destination DFoNP Address | DFoNP Current Node Identifier | DFoNP Length.Current Buffer Address |
|---|---|---|---|---|---|

12021  12022  12023  12024  12025  12026

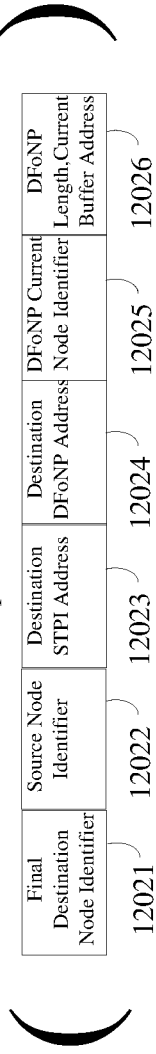

FIG. 12C

| Start – 8 bits | Sequence number – 16 bits | Reserved – 1 bit | Fmt – 2 bits = 1x | Type – 5 bits = 00000 | Reserved – 1 bit | TC – 3 bits | Reserved – 4 bits | TD – 1 bit = 1 |
|---|---|---|---|---|---|---|---|---|
| EP – 1 bit | | Attr – 2 bits | Reserved – 2 bits | Length – 10 bits | Requestor ID – 16 bits = ID of the switch | Tag – 8 bits | Last DW Byte Enable – 4 bits | First DW Byte Enable – 4 bits | Address 30 or 62 bits |
| Reserved – 2 bits | Frame Type = DFoNP | | Layer 3/4 Protocol Information | Data | ECRC | LCRC – 32 bits | End – 8 bits | | |

| Start – 8 bits | Sequence number – 16 bits | Reserved – 1 bit | Fmt – 2 bits = 1x | Type – 5 bits = 00000 | Reserved – 1 bit | TC – 3 bits | Reserved – 4 bits | TD – 1 bit = 1 |
|---|---|---|---|---|---|---|---|---|
| EP – 1 bit | | Attr – 2 bits | Reserved – 2 bits | Length – 10 bits | Requestor ID – 16 bits = ID of the switch | Tag – 8 bits | Last DW Byte Enable – 4 bits | First DW Byte Enable – 4 bits | Address 30 or 62 bits |
| Reserved – 2 bits | Frame Type = STPIs | | Number of STPIs = 2 | STPI[1], STPI[2] | ECRC | LCRC – 32 bits | End – 8 bits | | |

12041, 12042, 12043

Expanded view of STPI[2] corresponding to the DFoNP

| Final Destination Node Identifier | Source Node Identifier | Misc | DFoNP Current Node Identifier | DFoNP Length, Current Buffer Address |
|---|---|---|---|---|

12051, 12052, 12053, 12054, 12055

NETWORK CONGESTION AND PACKET REORDERING

CROSS-REFERENCE TO RELATED APPLICATIONS

This application is a continuation of U.S. application Ser. No. 15/268,729, filed on Sep. 19, 2016, entitled "Networking using PCI Express", now U.S. Pat. No. 10,110,498, issued on Oct. 23, 2018, which is a divisional application of U.S. application Ser. No. 14/120,845, filed on Jul. 1, 2014, entitled "Method for Congestion Avoidance", now U.S. Pat. No. 9,479,442, issued on Oct. 25, 2016, which is a continuation of U.S. application Ser. No. 13/385,155, filed on Feb. 6, 2012, entitled "Method for Identifying Next Hop", now U.S. Pat. No. 8,811,400 issued on Jul. 30, 2014, which is a continuation of U.S. application Ser. No. 11/505,788, filed on Aug. 18, 2006, entitled "Creation and Transmission of Part of Protocol Information Corresponding to Network Packets or Datalink Frames Separately", now U.S. Pat. No. 8,139,574 issued on Mar. 20, 2012, all of which are incorporated herein by reference in their entirety.

BACKGROUND OF THE INVENTION

The present invention relates to efficient transfer of datalink frame or network packets in a "custom" network. The network is "custom" as all switches and end nodes need to create or process datalink frames or data packets of special formats.

The OSI, or Open System Interconnection, model defines a networking framework for implementing protocols in seven layers. Most networking protocols do not implement all seven layers, but only a subset of layers. For example, TCP and IP protocol corresponds to layers 4 (TCP) and 3 (IP) respectively. Network packets contain protocol layer information corresponding to the packet. For example, a TCP/IP packet contains a header with both TCP and IP information corresponding to the packet.

The physical layer (layer 1) specifies how bits stream is created on a network medium and physical and electrical characteristics of the medium. The datalink layer (layer 2) specifies framing, addressing and frame level error detection. For outgoing packets to the network, the datalink layer receives network packets from networking layer (layer 3) and creates datalink frames by adding datalink (layer 2) protocol information and passes the frame to the physical layer. For incoming packets from network, datalink layer receives datalink frames from physical layer (layer 1), removes the datalink (layer 2) protocol information and passes network packet to the networking layer. The network layer (layer 3) specifies network address and protocols for end to end delivery of packets.

Network packets contain protocol layer information corresponding to the packet. FIG. 1A illustrates a network packet containing 01001 layer 1, 01002 layer 2, 01003 layer 3, 01004 layer 4 headers, 01005 Data and 01008 layer 1, 01007 layer 2, 01006 layer 3 trailers. FIG. 1B illustrates a network packet with 01011 layer 1, 01012 layer 2 (data link), 01013 layer 3 (networking) and 01014 layer 4 (transport) headers and 01017 layer 1 and 01016 layer 2 trailers and 01015 Data. For each layer, the corresponding header and trailer (if present) together contain all the protocol information required to send the packet/frame to the the consumer of the data in a remote node.

For example, headers/trailers corresponding to a TCP/IP packet in a 10BaseT Ethernet LAN are:

i) Physical layer header contains Start-of-Stream Delimiter
ii) Data link layer header contains Preamble, Start-of-Frame Delimiter, Ethernet Addresses, Length/Type Field etc.
iii) IP header contains Version, Length, IP Address etc.
iv) TCP header contains Port Numbers, Window, Flags etc.
v) Datalink layer trailer contains 32 bit FCS
vi) Physical layer trailer contains End-of-Stream Delimiter.

When parts of networks get congested and end nodes continue transmitting packets to congested parts of a networks, more and more switches can get congested. This can lead to switches dropping large number of packets, nodes retransmitting the dropped or lost packets and network slowing down.

U.S. Pat. No. 6,917,620 specifies a method and apparatus for a switch that separates the data portion and the header portion. This method has a disadvantage that overhead and logic for separating the data portion and the header portion and then combining the header portion and the data portion before transmission is required. This method also can not consolidate headers from more than one packet for transmission to the next node or delay packet arrival if the destination path of the packet is congested and therefore, can not avoid congestion.

According to claim 1)(c) of U.S. Pat. No. 5,140,582, the header portion of a packet is decoded prior to the receipt of full packet to determine the destination node. This invention can help with faster processing of the packet within a switch. This method can not consolidate headers from more than one packet for transmission to the next node or delay packet arrival if the destination path of the packet is congested and therefore, can not avoid congestion.

U.S. Pat. No. 6,032,190 specifies an apparatus and method of separating the header portion of an incoming packet and keeping the header portion in a set of registers and combining the header portion with the data portion before transmitting the packet. This method has a disadvantage that overhead and logic for separating the data portion and the header portion is required. This method can not consolidate headers from more than one packet for transmission to the next-node or delay packet arrival if the destination path of the packet is congested and therefore, can not avoid congestion.

U.S. Pat. No. 6,408,001 improves transport efficiency by identifying plurality of packets having common destination node, transmitting at least one control message, assigning label to these packets and removing part or all of header. This method has a disadvantage that switches need to identify messages with common destination node and additional logic to remove header and add label. This method can not delay packet arrival if the destination path of the packet is congested and therefore, can not avoid congestion.

BRIEF SUMMARY OF THE INVENTION

It is the object of the present invention to create and transmit part of protocol information separately from the Datalink Frame or Network Packet (DFoNP) containing data. The Separately Transmitted Protocol Information is referred to as STPI. Network congestion can be reduced or avoided using STPI.

According to the invention, there should be at least one DFoNP which contains the data and rest of the protocol information not contained in STPI, corresponding to each STPI. Preferably, there will be only one DFoNP corresponding to each STPI. The STPI and DFoNP together contain all the protocol information required to send the packet/frame to the the consumer of the data in a remote node.

The creation of STPI and DFoNP is done by the originator of the frame or packet such as an operating system in an end node. The format (contents and location of each information in a frame or packet) of the frame or packet containing STPI and DFoNP should be recognized by the final destination of the frame or packet. The format of STPI and DFoNP should also be recognized by switches in the network. So preferably, all STPIs and DFoNP in a given network should be of fixed formats.

Preferably, one or more STPIs are transmitted in a datalink frame or a network packet. The datalink frame containing STPIs is referred to as STPI Frame. The network packet containing STPIs is referred to as STPI packet. The switches in this case should be capable of extracting each STPI in an incoming STPI Frame or STPI packet and forwarding it to the next node in a different STPI Frame or STPI Packet. The switches can add each STPI from an incoming STPI Frame or STPI Packet into an STPI Frame or STPI Packet it creates. Preferably, the layer 2 address in the datalink frame containing multiple STPIs will be the next hop node address.

Optionally, STPI Frame or STPI Packet contains number of STPIs or length of the STPI frame. Optionally, STPI Frame or STPI Packet contains the offset or position of STPIs in the STPI frame—this is required only if STPIs supported by the network are not of fixed length.

Optionally, STPI Frame or STPI Packet does not contain the number of STPIs and switches in the network are capable of identifying the number of STPIs from length of the frame as they are of fixed length.

Preferably, some protocol information contained in STPI may not be contained in the corresponding DFoNP. But protocol information contained in STPI and the corresponding DFoNP need not be mutually exclusive. In this method, the switches obtain both STPI and the corresponding DFoNP before the STPI and the corresponding DFoNP are forwarded. Optionally, STPI need not be forwarded to end node if sufficient protocol information is contained in the corresponding DFoNP.

The proposed invention can be employed for data, control and/or RDMA packets in a network.

The proposed method allows switches to read the more than one STPI, and then delay obtaining the corresponding DFoNP. The DFoNP may be read or forwarded in a different order compared to the order in which STPI are read or forwarded. This method allows switches to optimize resources and packet/frame forwarding efficiency.

STPI contain temporary information such as current node or port number of the node containing the corresponding DFoNP. STPI also contains an address of a buffer containing the corresponding DFoNP or an offset in a buffer where the corresponding DFoNP is stored or an index of the corresponding DFoNP in an array. These information help in associating STPI to the corresponding DFoNP. The exact information contained in STPI whether it is an address or an offset or an index or a combination of these is implementation specific.

Optionally, STPI may contain originating node identifier and a sequence number. Such information can help in reporting errors when STPI or corresponding DFoNP are corrupted or lost.

Optionally, STPI may contain other vendor specific or DFoNP related miscellaneous information.

Optionally, DFoNP may contain some information that help in associating itself with corresponding STPI, such as originating node identifier and a sequence number. Preferably, DFoNP sequence number is same as the sequence number of the corresponding STPI.

Optionally, DFoNP may contain other vendor specific miscellaneous information.

The originating node creating an STPI by creating and initializing one or more data structures. Preferably, there is only one data structure containing STPI.

A switch receiving both frame containing STPI and the DFoNP before forwarding a frame containing STPI or DFoNP to the next switch or node.

Preferably, a switch receiving frame containing STPI before reading the corresponding DFoNP.

A switch can delay transmitting or reading DFoNP after the corresponding STPI is transmitted or received, allowing the switch to optimize its resource usage and improve efficiency.

A switch can read DFoNPs corresponding to a switch port with minimum outbound traffic, ahead of other DFoNPs, thereby improving link efficiency.

The switch modifying temporary information in STPI such as node number or port number corresponding to the node containing corresponding DFoNP and buffer pointer or index or offset for the corresponding DFoNP, when the DFoNP is transmitted to another node.

If the DFoNP and STPI is forwarded to another subnet, layer 2 information in STPI and DFoNP should be updated to be compatible with the subnet to which it is forwarded (for example, in an IP network when a packet moves from Ethernet to ATM, layer 2 protocol information will have to be modified to be made compatible with ATM network).

If STPI contains a multicast or broadcast destination address, the switch transmitting both the DFoNPs and the STPI to all next hop nodes identified by the address.

A switch can delay reading or forwarding the DFoNP after the corresponding STPI is received or forwarded, and vice versa.

A switch may or may not receive or transmit DFoNPs in the same order as the corresponding STPIs are received or transmitted from a switch port.

Optionally, a switch may receive or transmit one or more DFoNP in one frame.

For networks that support layer 5/6/7 (example OSI networks), STPI optionally containing part of or all of layer 5/6/7 information. Preferably, no layer 5/6/7 information may be contained in STPI.

BRIEF DESCRIPTION OF THE SEVERAL VIEWS OF THE DRAWINGS

FIG. 3A illustrates Switch/Node A containing an STPI and the corresponding DFoNP to be transmitted to the Switch/Node B.

FIG. 3B illustrates the Switch/Node A sending an STPI frame containing the STPI.

FIG. 3C illustrates the Switch/Node B deciding to fetch the DFoNP corresponding to the STPI and sending Read-DFoNP Frame to the Switch/Node A containing the Read-DFoNP request for the DFoNP.

FIG. 3D illustrates the Switch/Node A responding to the Read-DFoNP request for the DFoNP by sending the DFoNP.

FIG. 4C illustrates the Switch/Node A transmitting the DFoNP to the Switch/Node B.

FIG. 4D illustrates the Switch/Node B updating the STPI with the location of the DFoNP in the Switch/Node B.

FIG. 6C illustrates the Switch/Node A transmitting the DFoNP corresponding to the STPI to the Switch/Node B.

FIG. 6D illustrates the STPI being updated with identifier of the Switch/Node B and the location of the corresponding DFoNP in the Switch/Node B.

FIG. 12A illustrates format of PCI Express Read Completion containing DFoNP, from a root bridge in response to a Memory Read request from a switch.

FIG. 12B illustrates format of PCI Express Read Completion containing STPIs, from a root bridge in response to a Memory Read request from a switch.

FIG. 12C illustrates a PCI Express Memory Write transaction containing DFoNP, from a switch to a root bridge.

FIG. 12D illustrates a PCI Express Memory Write transaction containing STPIs, from a switch to a root bridge.

DETAILED DESCRIPTION OF THE INVENTION

Figure 1A:
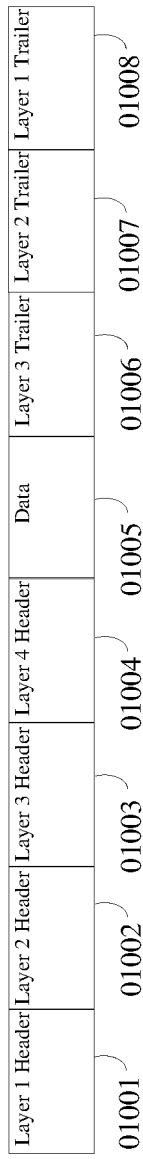
FIG. 1A illustrates a network packet containing layer 1, layer 2, layer 3, layer 4 headers, Data and layer 1, layer 2, layer 3 trailers.
Figure 1B:
FIG. 1B illustrates a network packet with layer 1, layer 2 (data link), layer 3 (networking) and layer 4 (transport) headers and layer 1 and layer 2 trailers and Data.
Figure 2A:
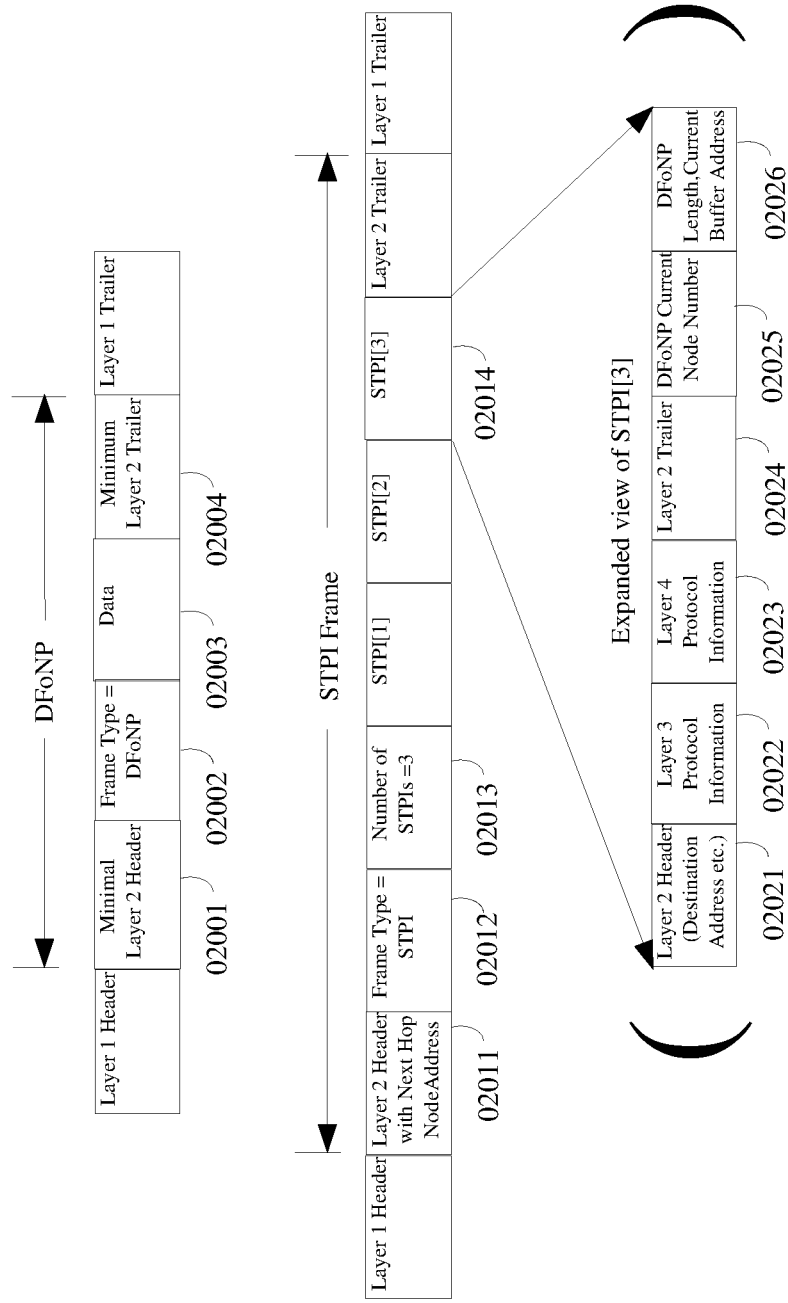
FIG. 2A illustrates example formats for DFoNP, the corresponding STPI and an STPI frame which contain STPIs.
Figure 2B:
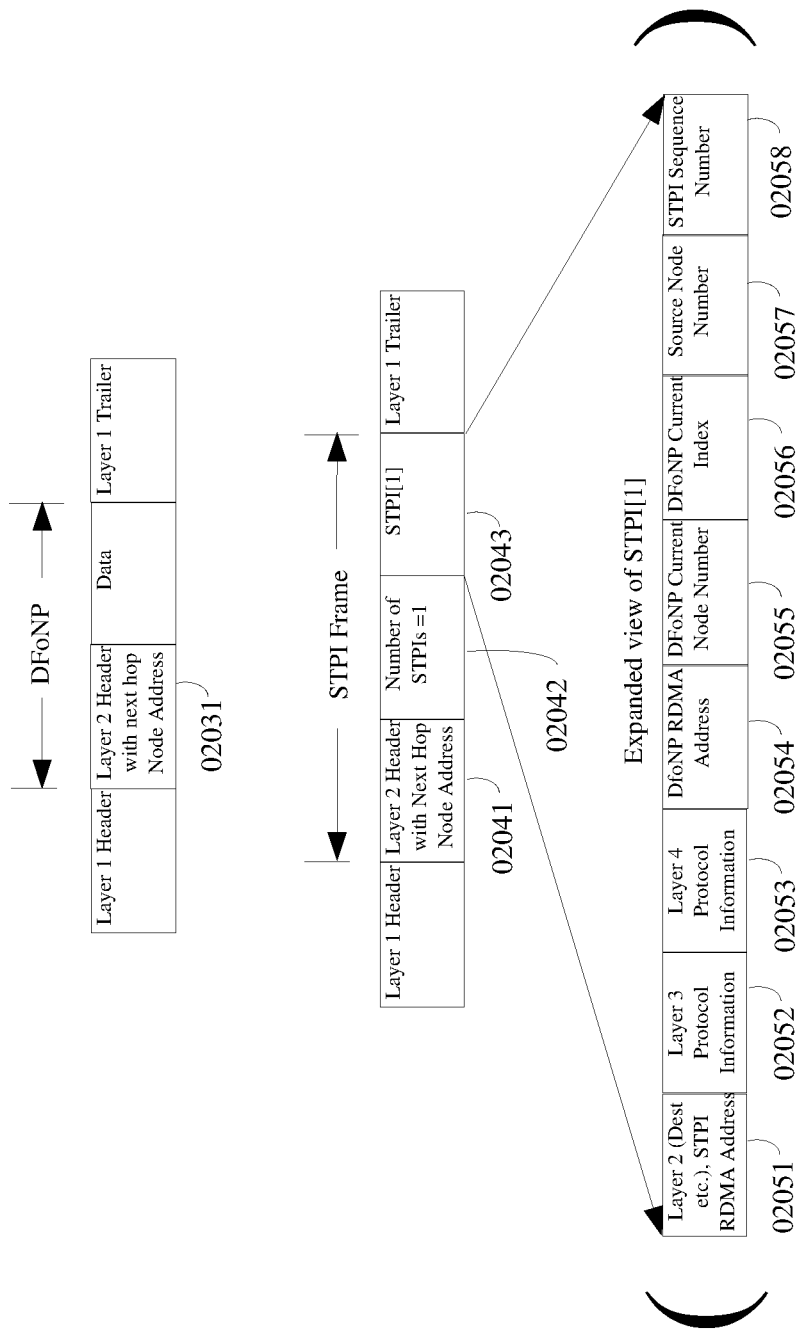
FIG. 2B illustrates example formats for DFoNP, the corresponding STPI and an STPI frame which contain STPIs.
Figure 2C:
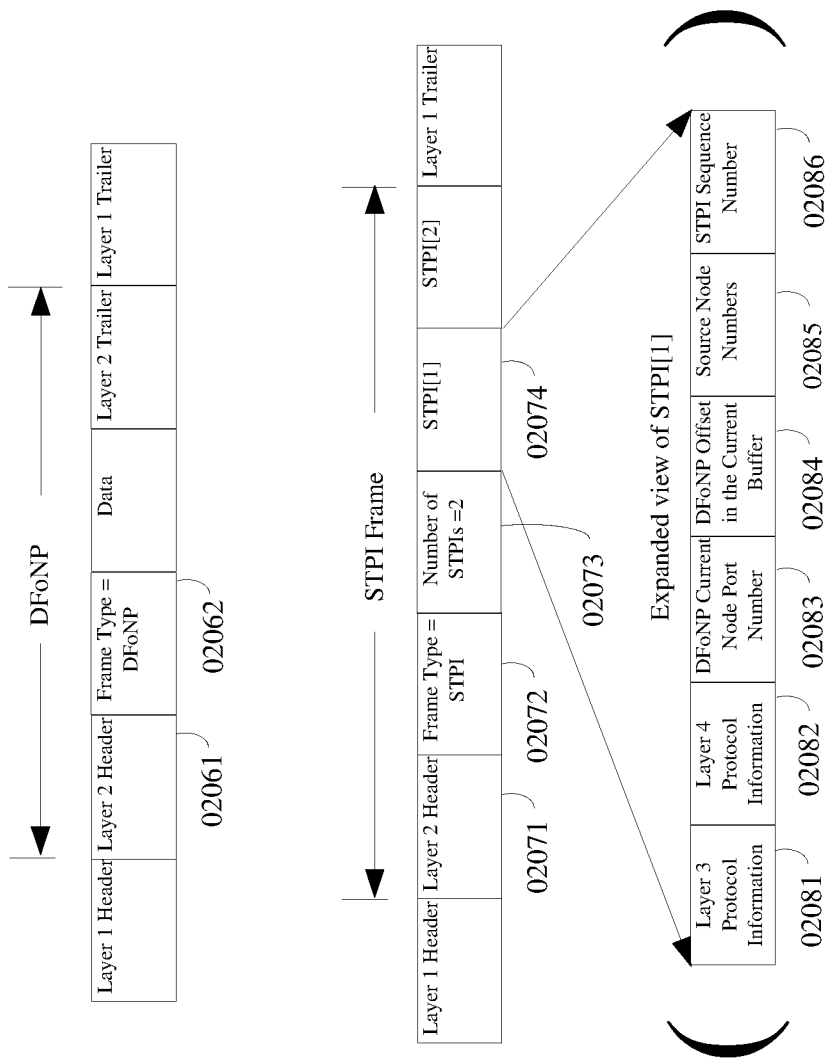
FIG. 2C illustrates example formats for DFoNP, the corresponding STPI and an STPI frame which contain STPIs.
Figure 2D:
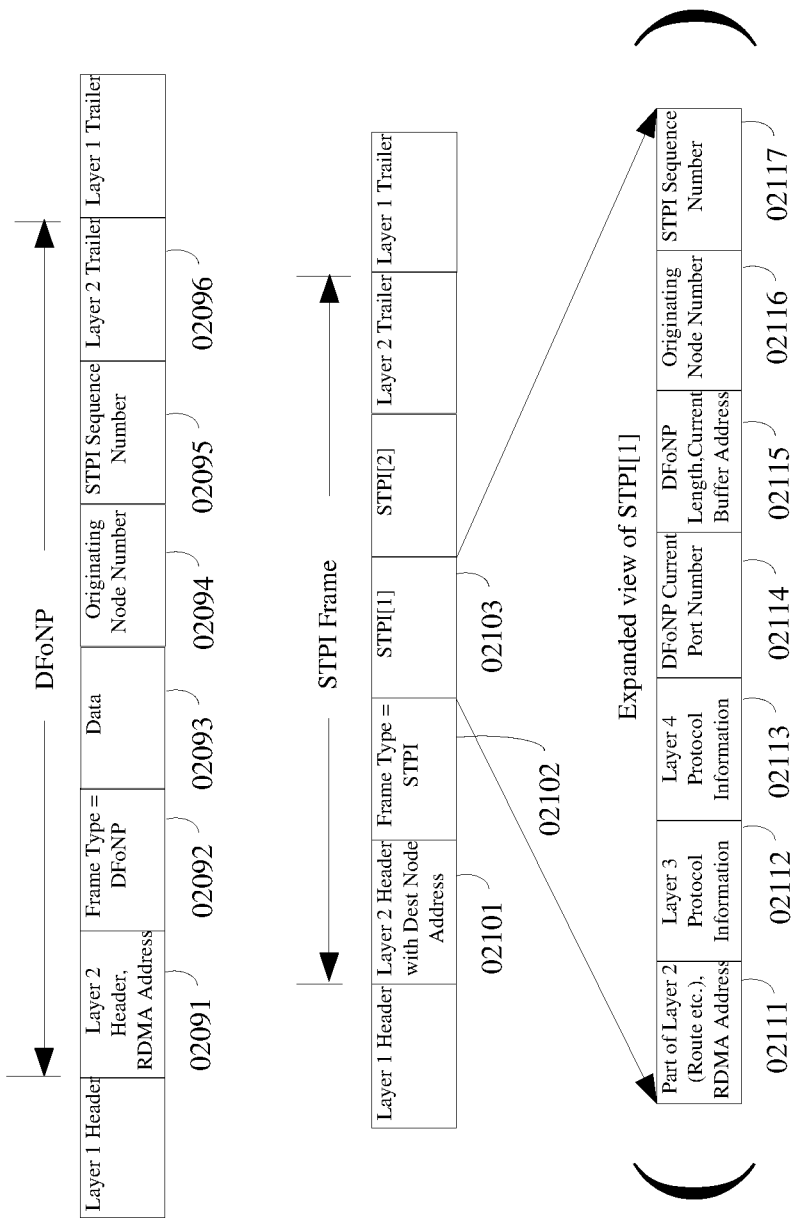
FIG. 2D illustrates example formats for DFoNP, the corresponding STPI and an STPI frame which contain STPIs.
Figure 2E:
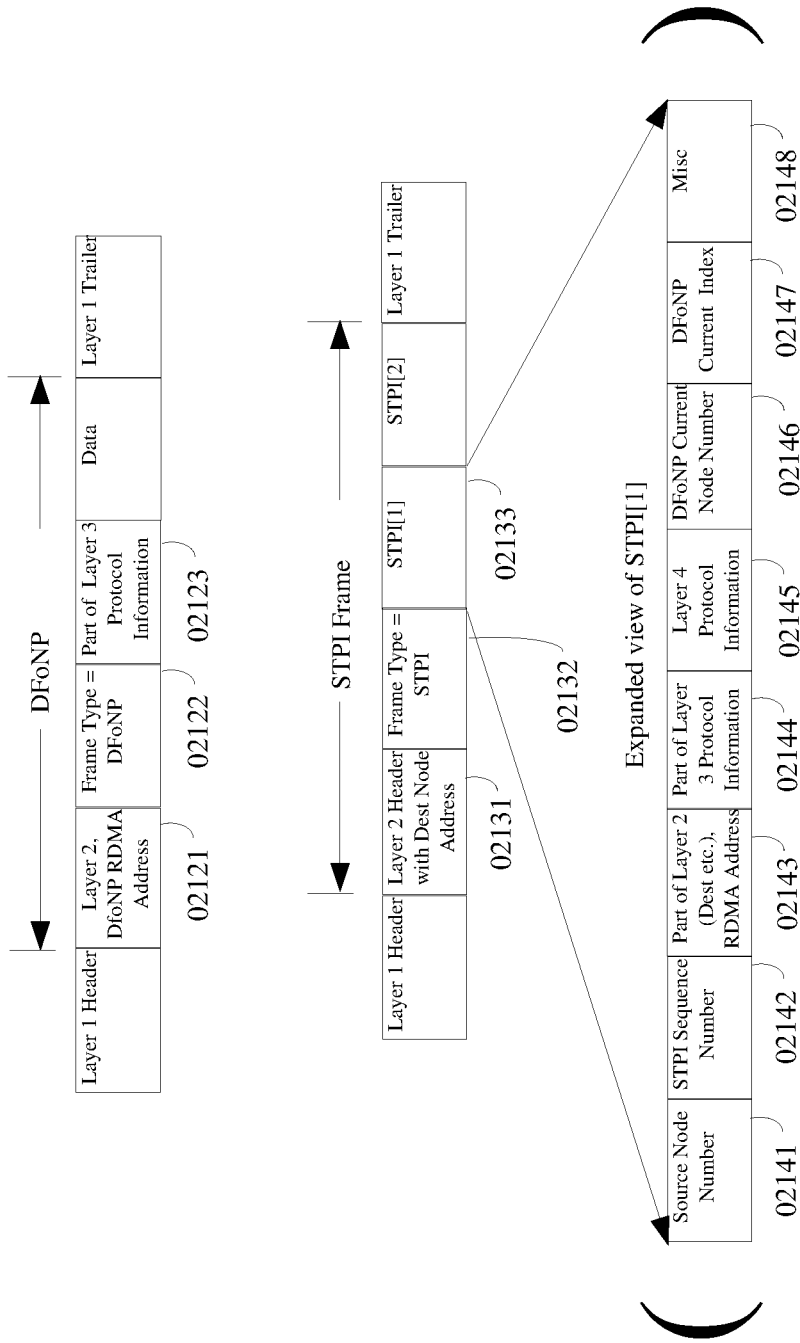
FIG. 2E illustrates example formats for DFoNP, the corresponding STPI and an STPI frame which contain STPIs.
Figure 2F:
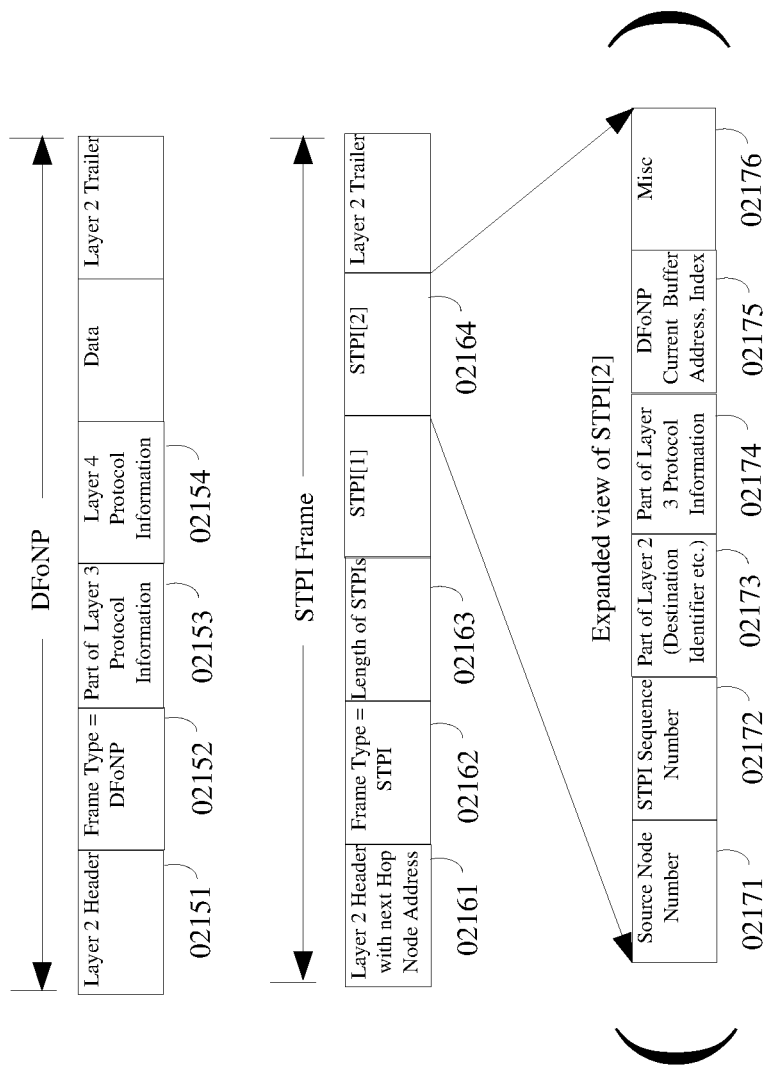
FIG. 2F illustrates example formats for DFoNP, the corresponding STPI and an STPI frame which contain STPIs.
Figure 2G:
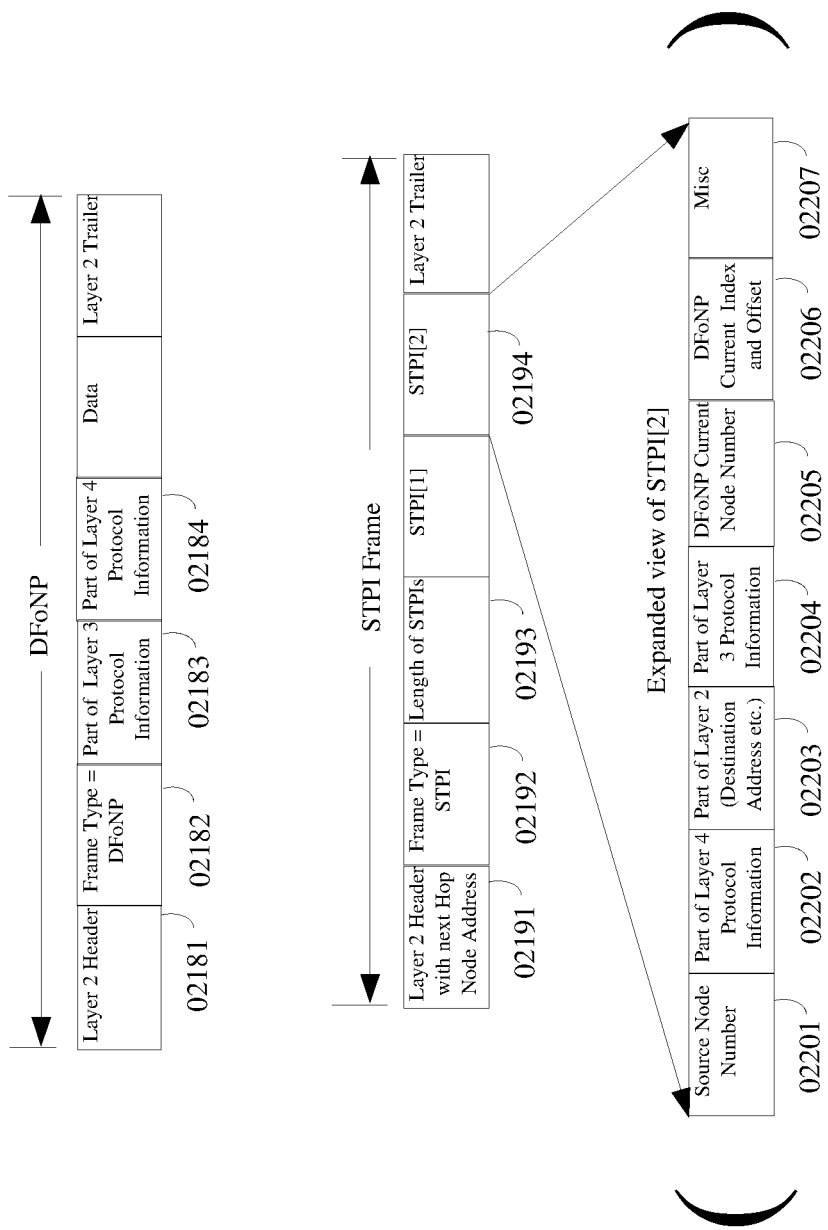
FIG. 2G illustrates example formats for DFoNP, the corresponding STPI and an STPI frame which contain STPIs.
Figure 2H:
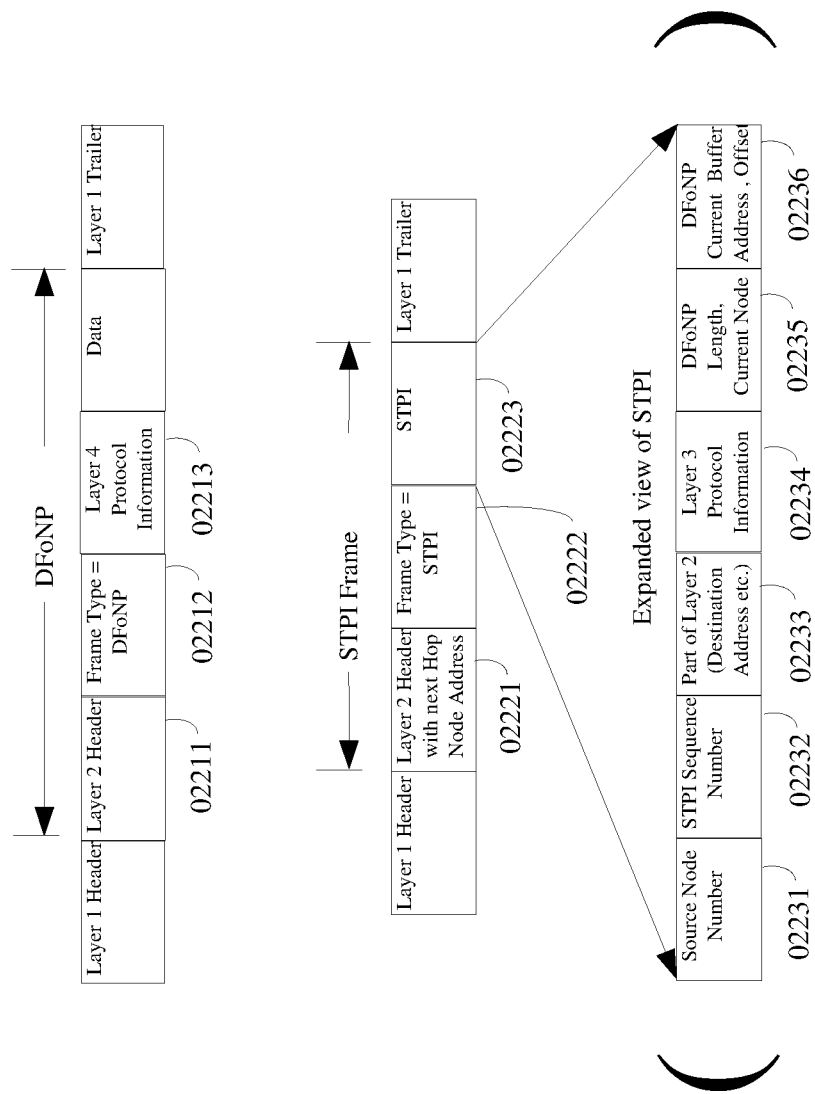
FIG. 2H illustrates example formats for DFoNP, the corresponding STPI and an STPI frame which contain STPIs.
Figure 2I:
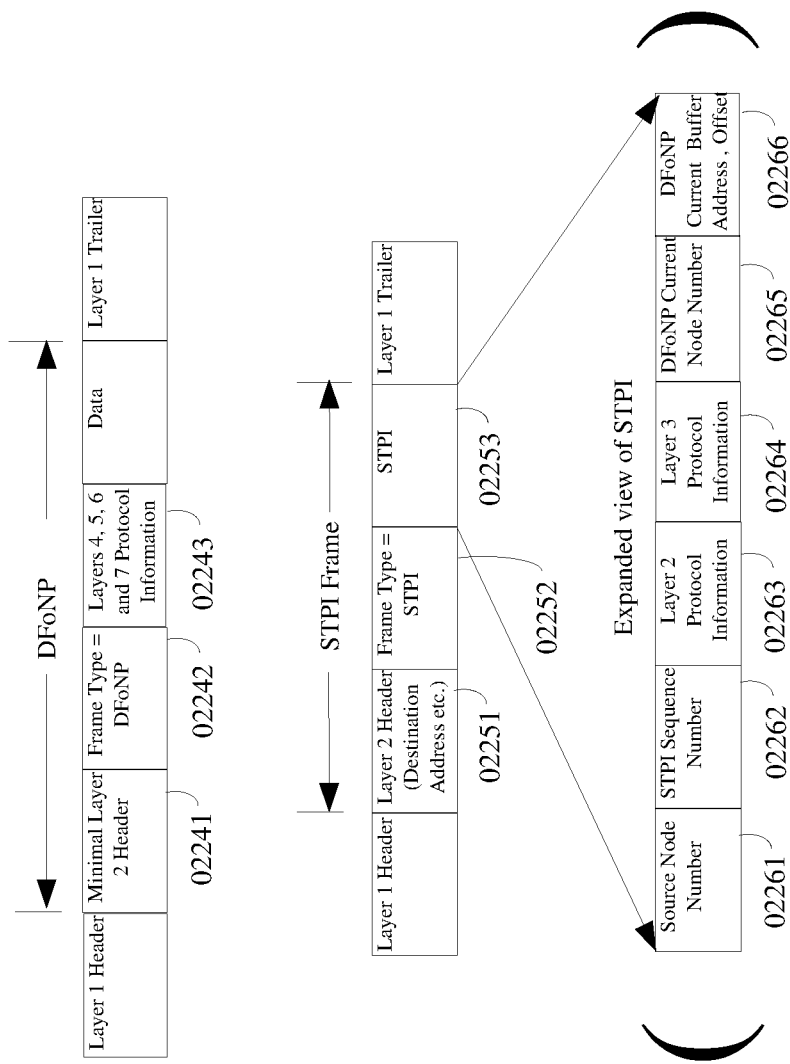
FIG. 2I illustrates example formats for DFoNP, the corresponding STPI and an STPI frame which contain STPIs.
Figure 2J:
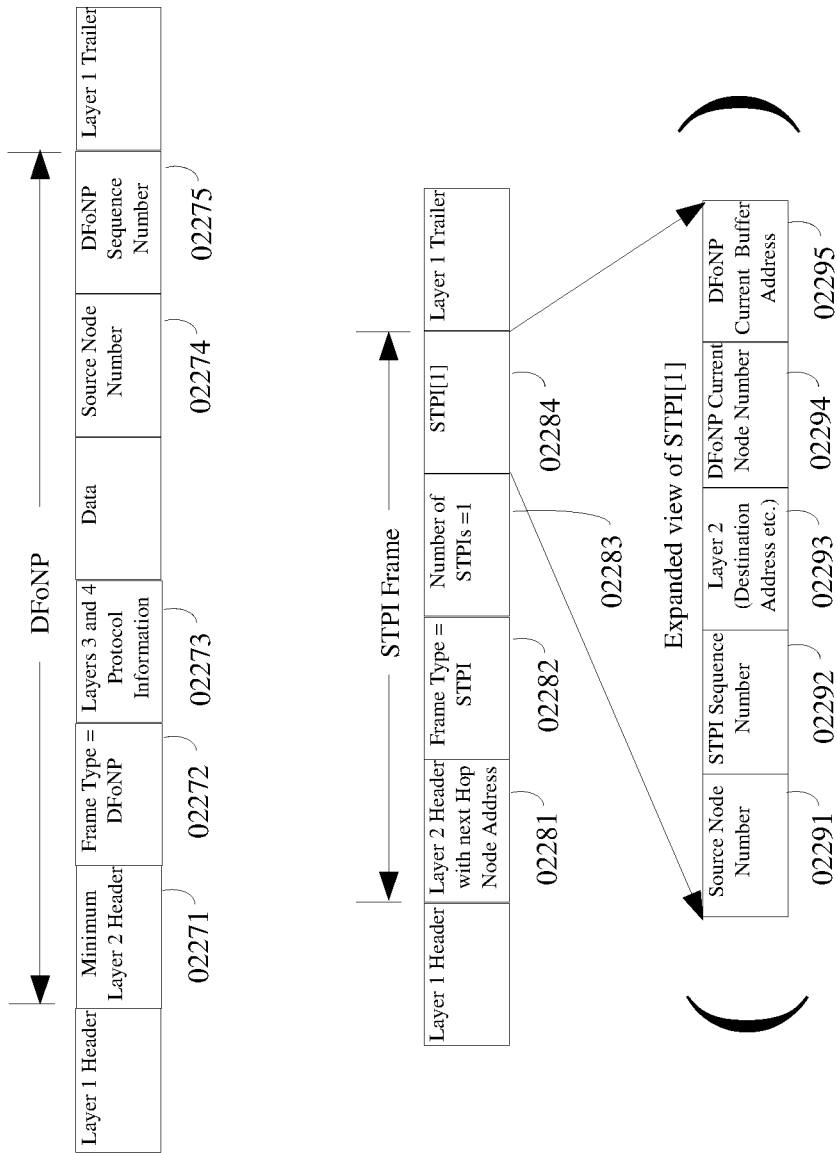
FIG. 2J illustrates example formats for DFoNP, the corresponding STPI and an STPI frame which contain STPIs.
Figure 2K:
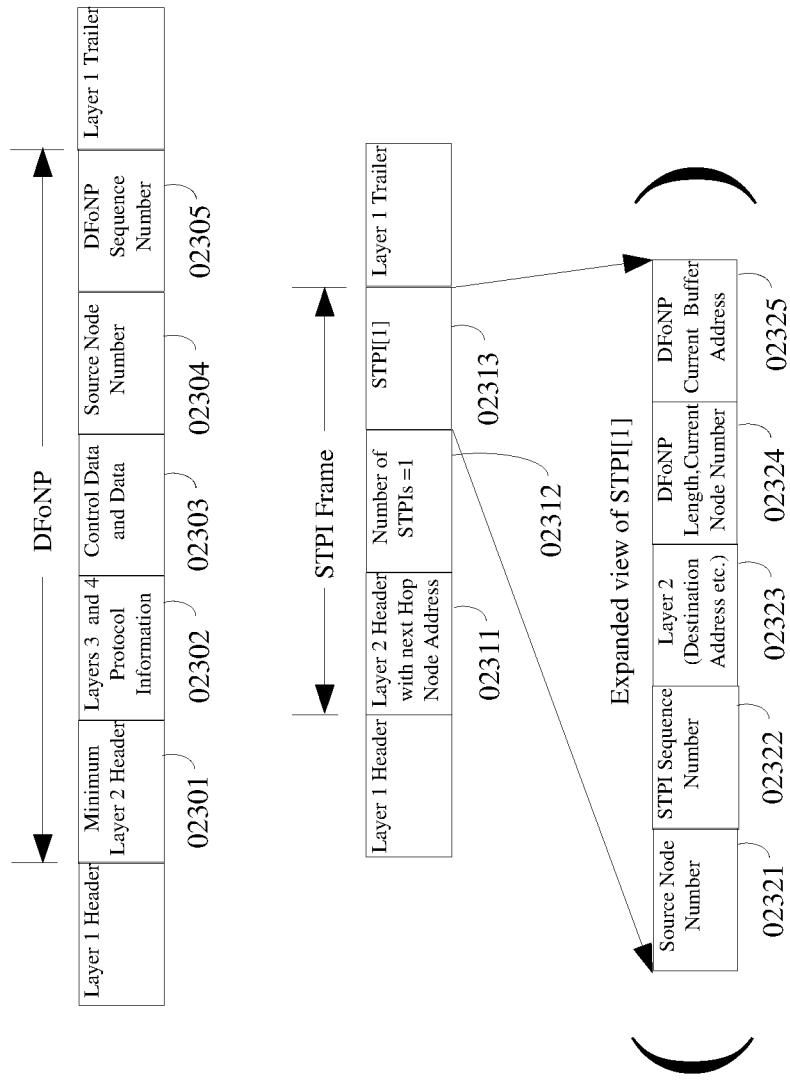
FIG. 2K illustrates example formats for DFoNP, the corresponding STPI and an STPI frame which contain STPIs.
Figure 2L:
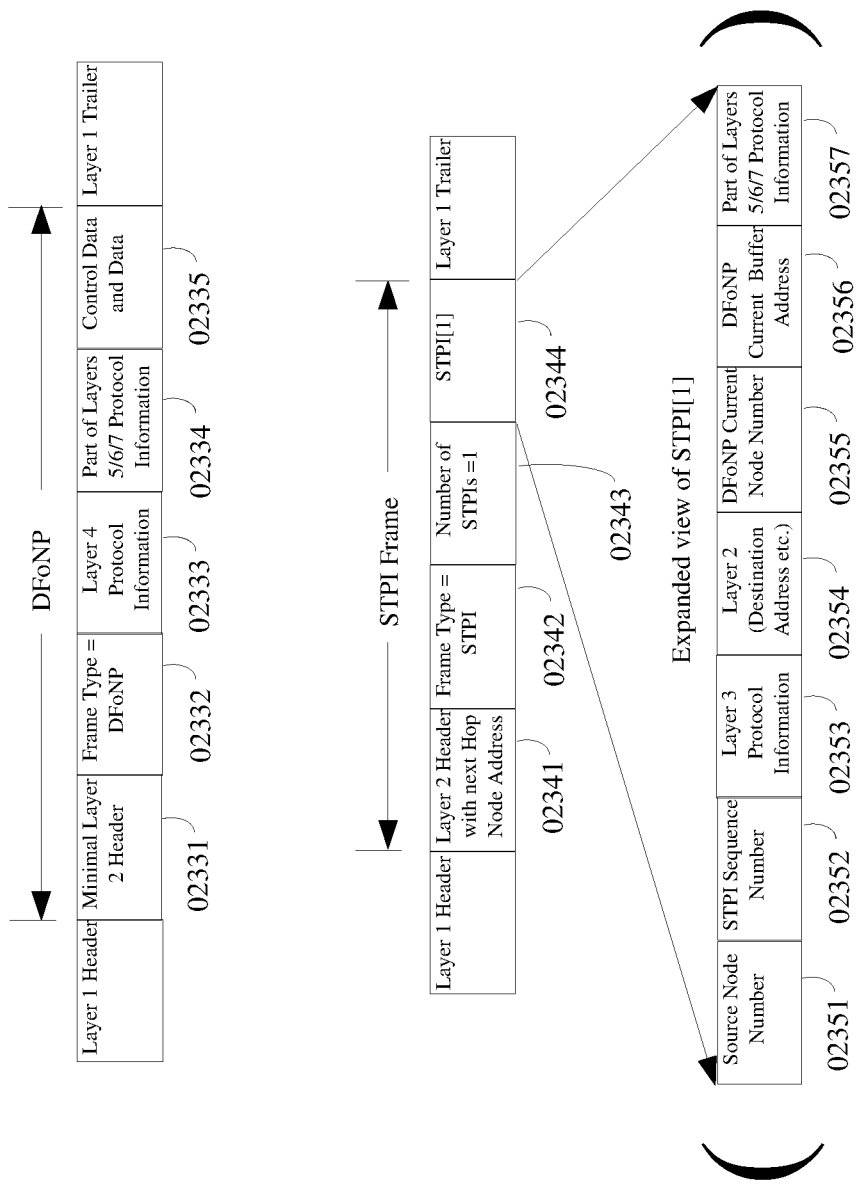
FIG. 2L illustrates example formats for DFoNP, the corresponding STPI and an STPI frame which contain STPIs.
Figure 2M:
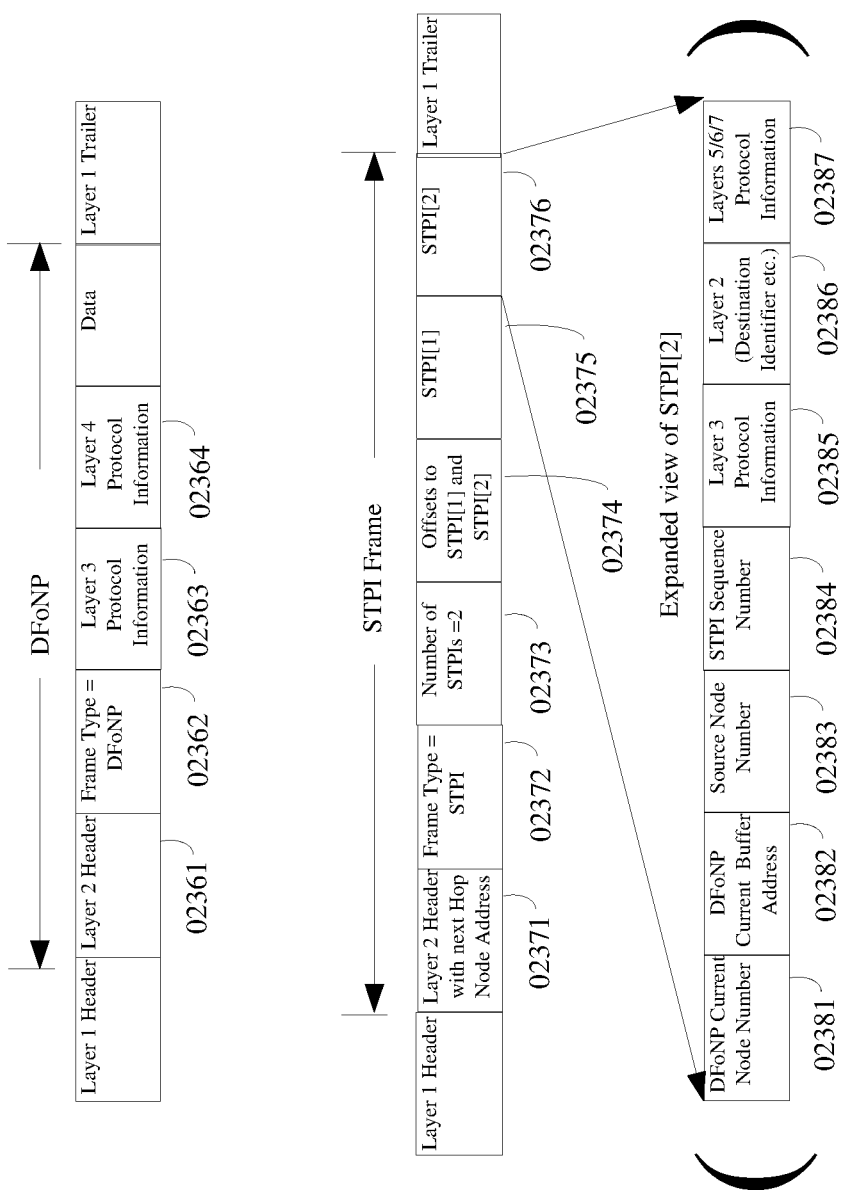
FIG. 2M illustrates example formats for DFoNP, the corresponding STPI and an STPI frame which contain STPIs.
Figure 2N:
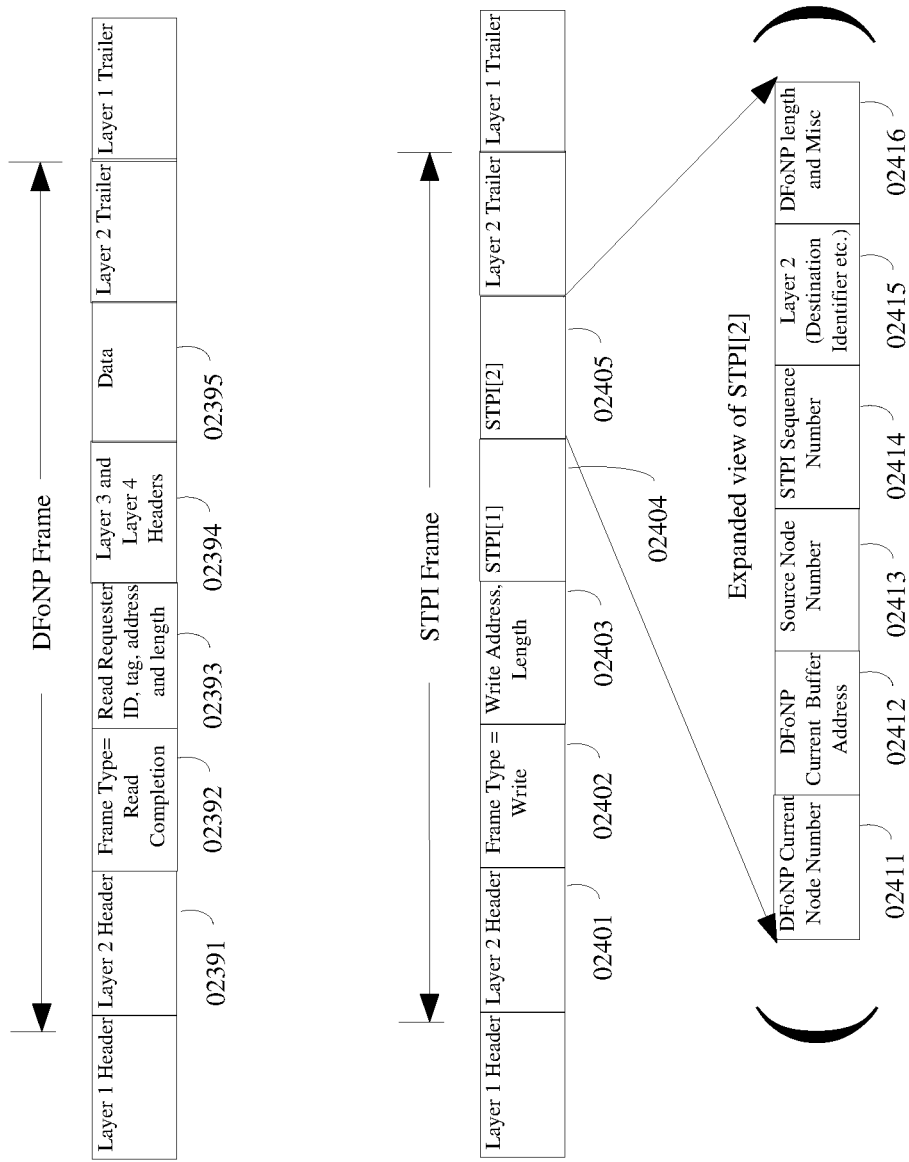
FIG. 2N illustrates example formats for DFoNP, the corresponding STPI and an STPI frame which contain STPIs.

There are a very large number of design options with network component designers with respect to the format of DFoNP, STPI and STPI frame/packet. FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 2L, FIG. 2M and FIG. 2N illustrate some examples of different formats in which the STPI and the corresponding DFoNP can be created adhering to this invention. The layer 2, layer 3, and layer 4 information that may be present in the DFoNP and STPI may or may not be mutually exclusive and is dependent on specific format or formats of STPI and DFoNP supported by switches and endnodes. Each network will employ only few STPI/DFoNP formats (preferably, as few as 1-3), one each for a subtype of a packet or a frame. Preferably, a network may employ only one format for STPI and one format for DFoNP to reduce complexity in switches and endnodes. STPI should have enough information for the switch to find the port for the next hop.

i) FIG. 2A illustrates example formats for DFoNP, the corresponding STPI and an STPI frame which contain STPIs. All layer 2 02021 02024 (including Destination Node Address used for routing), layer 3 02022 and layer 4 02023 information are in STPI and the DFoNP contains no layer 3 and 4 information. DFoNP contains minimal layer 2 02001 02004 information mandated by datalink layer (an example of optional layer 2 information is the VLAN tag in Ethernet). Frame Type in the frame gives the type of frame, DFoNP 02002, STPI 02012, etc. All data 02003 are in DFoNP. Three STPIs 02013 are sent in a STPI Frame. The destination address 02011 of the STPI Frame is the next hop switch or node address. In this example, 3rd STPI 02014 in the STPI Frame corresponds to the DFoNP shown. The STPI contains the length 02026 of the corresponding DFoNP and the current node number 02025 and current buffer address 02026 containing the corresponding DFoNP. When the DFoNP is transmitted to the next node the node number 02025 and buffer address 02026 in the corresponding STPI are updated.

ii) FIG. 2B illustrates example formats for DFoNP, the corresponding STPI and an STPI frame which contain STPIs. The frames in this network do not have layer 2 trailer. All layer 2 02051 (includes destination node address for routing), RDMA address 02051 for STPI in the destination node, RDMA address 02054 for DFoNP in the destination node, layer 3 02052 and layer 4 02053 information are in STPI. The DFoNP contains no layer 3 and 4 information. In this network, layer 2 02031 02041 contains frame type and hence, no additional field for frame type is present. DFoNP contains layer 2 header 02031 with next hop node address. STPI contains the node number 02055 and an index 02056 to the array containing the corresponding DFoNP. When DFoNP is transmitted to the next node, the node number 02055 and the index 02056 in the corresponding STPI are updated. STPI also contains Source Node Number 02057 (the node number of the node which created the STPI) and STPI sequence number 02058. The STPI 02042 02043 is the only STPI in the STPI Frame.

iii) FIG. 2C illustrates example formats for DFoNP, the corresponding STPI and an STPI frame which contain STPIs. All layer 3 02081 and layer 4 02082 information are in STPI and the DFoNP contains all 02061 layer 2 information. In this network, switches use 02081 layer 3 address to find next hop port. So 02071 layer 2 of STPI Frame does not have next hop node address. Frame Type in the frame gives the type of frame, DFoNP 02062, STPI 02072, etc. There are 2 STPIs 02073 in the STPI Packet and the first STPI 02074 corresponds to DFoNP. STPI contains the DFoNP Current Node Port Number 02083 corresponding to the node containing DFoNP and an offset 02084 in a buffer to the current location of the corresponding DFoNP. The port number 02083 is the port number on the switch containing STPI. When DFoNP is transmitted to the next node, the port number 02083 and offset 02084 in the corresponding STPI are updated. The port number 02083 is also updated-when STPI is transmitted to the next node. STPI also contains Source Node Number 02085 and a sequence number 02086.

iv) FIG. 2D illustrates example formats for DFoNP, the corresponding STPI and an STPI frame which contain STPIs. STPI contains layer 3 02112, layer 4 02113, and part of layer 2 02111 protocol information (including route to the destination), RDMA address 02111 for STPI in the destination node. DFoNP contains data 02093, part of layer 2 protocol information 02091 02096 and RDMA address 02091 for the DFoNP in the destination node. STPI contains 02115 DFoNP length and the port number 02114 and the buffer address 02115 to the location of the corresponding to DFoNP. When DFoNP is transmitted to the next node, the port number 02114 is reset (as DFoNP is in the same node) and buffer address 02115 in the corresponding STPI are updated. DFoNP Port number 02114 is also updated when STPI is transmitted to the next node. Both STPI and DFoNP contains originating node number 02116 02094 and STPI sequence number 02117 02095. The address in the datalink header 02101 of the STPI Frame is the final destination node address in the subnet indicating all STPIs in the STPI Frame are to the same final destination and switching can be done using STPI Frame address. Frame Type in the frame gives the type of frame, DFoNP 02092, STPI 02102, etc. STPI Frame does not contain the number of STPIs as STPIs are of fixed length and the number of STPIs can be derived from the length of STPI frame. The first STPI 02103 in the frame corresponds to the DFoNP shown.

v) FIG. 2E illustrates example formats for DFoNP, the corresponding STPI and an STPI frame which contain STPIs. STPI contains part of 02143 layer 2 (Layer 2 in STPI contains destination address used for routing), RDMA address 02143 for STPI in the destination node, 02144 part of layer 3 information and all of 02145 layer 4 information. The DFoNP contains 02121 layer 2 protocol information, RDMA address 02121 for DFoNP in the destination node and 02123 part of layer 3 information. Frame Type in the frame gives the type of frame, DFoNP 02122, STPI 02132, etc. STPI corresponding to the DFoNP shown is the first STPI 02133 in the STPI Frame. STPI contains the current node number 02146 and index 02147 to the location of the corresponding to DFoNP. When DFoNP is transmitted to the next node, the node number 02146 and index 02147 in the corresponding STPI are updated. STPI also contains Source Node Number 02141, STPI Sequence Number 02142 and miscellaneous 02148 information. The layer 2 header 02131 of the STPI frame contains next hop node address.

vi) FIG. 2F illustrates example formats for DFoNP, the corresponding STPI and an STPI frame which contain STPIs. The network medium does not support layer 1 header or trailer. STPI contains part of layer 2 02173 (including destination node identifier used for routing) and part of layer 3 02174 protocol information. DFoNP contains layers 2 02151, part of layer 3 02153 and all of layer 4 02154 protocol information. STPI contains the buffer address 02175 and an index 02175 in the buffer to the location of the corresponding to DFoNP. When DFoNP is transmitted to the next node, buffer address 02175 and offset 02175 in the corresponding STPI are updated. STPI also contains Source Node Number 02171, STPI sequence number 02172 and miscellaneous 02176 information. Frame Type in the frame gives the type of frame, DFoNP 02152, STPI 02162, etc. The STPI Frame contains length 02163 of STPIs and since STPIs of this network are of fixed length, the position of the STPIs in the frame can be determined by the switch. Expanded view of the second STPI 02164 in the STPI frame is shown. The layer 2 header 02161 of the STPI frame contains next hop node address.

vii) FIG. 2G illustrates example formats for DFoNP, the corresponding STPI and an STPI frame which contain STPIs. The network medium does not support layer 1 header or trailer. STPI contains part of layer 2 02203 (including destination node address for routing), part of layer 3 02204 and part of layer 4 02202 protocol information. DFoNP contains layer 2 02181, part of layer 3 02183 and part of layer 4 02184 protocol information. STPI contains the current node number 02205, an index to a buffer 02206 and an offset 02206 in the buffer to the location of the corresponding DFoNP. When DFoNP is transmitted to the next node, the node number 02205, the index 02206 and the offset 02206 in the corresponding STPI are updated. STPI also contains the Source Node Number 02201 and miscellaneous 02207 information. Frame Type in the frame gives the type of frame, DFoNP 02182, STPI 02192, etc. The STPI Frame contains length 02193 of STPIs and since STPIs of this example are of fixed length, the position of the STPIs in the frame can be determined by the switch. Expanded view of the second STPI 02194 in the frame is shown. The layer 2 header 02191 of the STPI frame contains next hop node address.

viii) FIG. 2H illustrates example formats for DFoNP, the corresponding STPI and an STPI frame which contain STPIs. STPI contains part of layer 2 02233 (including destination node address for routing) and all of layer 3 02234 protocol information. The DFoNP contains layer 2 02211 and layer 4 02213 protocol information. STPI contains the length 02235 of the corresponding DFoNP and the current node identifier 02235, buffer address 02236 and an offset 02236 in a buffer to the location of the corresponding DFoNP. When DFoNP is transmitted to the next node, the Current Node identifier 02235, buffer address 02236 and the offset 02236 in the corresponding STPI are updated. STPI also contains Source Node Number 02231 and STPI Sequence Number 02232. Frame Type in the frame gives the type of frame, DFoNP 02212, STPI 02222, etc. The STPI Frame in this example is allowed to have only one STPI 02223. The layer 2 header 02221 of the STPI frame contains next hop node address. Expanded view of the STPI is shown.

ix) FIG. 2I illustrates example formats for DFoNP, the corresponding STPI and an STPI frame which contain STPIs. The network supports protocol layers 5, 6 and 7 in addition to lower layers. STPI contains 02263 layer 2 and 02264 layer 3 information. The DFoNP contains minimal layer 2 02241 protocol information allowed by the datalink layer, layer 4, layer 5, layer 6, and layer 7 02243 protocol information. STPI contains the current node number 02265, a buffer address 02266 in the node and an offset 02266 in the buffer to the location of the corresponding DFoNP. When DFoNP is transmitted to the next node, the node number 02265, the buffer address 02266 and the offset 02266 in the corresponding STPI are updated. STPI also contains Source Node Number 02261 and STPI sequence number 02262. Frame Type in the frame gives the type of frame, DFoNP 02242, STPI 02252, etc. The STPI Frame in this example is allowed to have only one STPI 02253 and 02251 layer 2 of the STPI frame contains address of the destination node in the subnet which is used for routing the STPI frame. Expanded view of the STPI is shown.

x) FIG. 2J illustrates example formats for DFoNP, the corresponding STPI and an STPI frame which contain STPIs. STPI contains layer 2 02293 protocol information (including destination node address for routing). The DFoNP contains 02271 part of layer 2 and all of layer 3 and layer 4 02273 protocol information. Frame Type in the frame gives the type of frame, DFoNP 02272, STPI 02282, etc. The STPI[1] 02284 is the only STPI 02283 in the STPI Frame. STPI contains the current node number 02294 and the buffer address 02295 in the node to the location of the corresponding DFoNP. When DFoNP is transmitted to the next node, the node number 02294 and the buffer address 02295 in the corresponding STPI are updated. STPI also contains Source Node Number 02291 and STPI Sequence Number 02292. DFoNP contains Source Node Number 02274 and a DFoNP sequence number 02275 which is different from STPI sequence number. The layer 2 header 02281 of the STPI frame contains next hop node address. Expanded view of the STPI[1] is shown.

xi) FIG. 2K illustrates example formats for DFoNP, the corresponding STPI and an STPI frame which contain STPIs. STPI contains layer 2 02323 information (including destination node address for routing). The DFoNP contains minimal layer 2 02301 mandated by datalink layer of the subnetwork and all of layer 3 and 4 02302 information. The DFoNP contains control data 02303 such as requests to open a file in addition to data 02303. In this network, layer 2 02301 02311 protocol information contains frame type and hence, no additional field for frame type is present. The STPI[1] 02313 is the only STPI 02312 in the STPI Frame. STPI contains the length 02324 of the corresponding DFoNP and the node number 02324 and the buffer address 02325 in the node to the location of the corresponding to DFoNP. When DFoNP is transmitted to the next node, the node number 02324 and buffer address 02325 in STPI are updated. STPI also contains the Source Node Number 02321 and STPI sequence number 02322. DFoNP contains Source Node Number 02304 and a DFoNP Sequence Number 02305 which is different from STPI sequence number. Expanded view of STPI[1] is shown.

xii) FIG. 2L illustrates example formats for DFoNP, the corresponding STPI and an STPI frame which contain STPIs. STPI contains layer 2 02354 (including destination node address for routing) and layer 3 information 02353 and part of layer 5/6/7 02357 protocol information. The DFoNP contains minimal layer 2 Header 02331 mandated by datalink layer of the subnet, layer 4 02333 and part of layer 5/6/7 02334 protocol information. The DFoNP contains control data 02335 such as requests to open a file in addition to data 02335. Frame Type in the frame gives the type of frame, DFoNP 02332, STPI 02342, etc. The STPI[1] 02344 is the only STPI 02343 in the STPI Frame. STPI contains the node number 02355 and buffer address 02356 in the node to the location of the corresponding DFoNP. When DFoNP is transmitted to the next node, the node number 02355 and buffer address 02356 in the corresponding STPI are updated. STPI also contains the Source Node Number 02351 and STPI sequence number 02352. The layer 2 header 02341 of the STPI frame contains next hop node address. Expanded view of the STPI[1] 02344 is shown.

xiii) FIG. 2M illustrates example formats for DFoNP, the corresponding STPI and an STPI frame which contain STPIs. STPI contains layer 2 02386 (including destination node identifier used for routing), layer 3 02385 and layers 5/6/7 02387 protocol information. The DFoNP contains layers 2 02361, layer 3 02363 and layer 4 02364 protocol information. Frame Type in the frame gives the type of frame, DFoNP 02362, STPI 02372, etc. STPI frame contains two STPIs 02373 and expanded view of the 2nd STPI (STPI[2]) 02376 is shown. The STPI frame contains offsets 02374 to all STPIs in the frame. The network in this example supports more than one length for STPIs. STPI[1] offset 02374 gives the location of the first STPI (STPI[1] 02375) in the STPI frame. STPI[2] offset 02374 gives the location of the second STPI in the STPI frame. Offsets in this example are with respect to beginning of the frame. STPI contains the node number 02381 and buffer address 02382 in the node to the location of the corresponding DFoNP. When DFoNP is transmitted to the next node, the node number 02381 and buffer address 02382 in STPI are updated. STPI also contains Source Node Number 02383 and STPI sequence number 02384. The layer 2 header 02371 of the STPI frame contains next hop node address.

xiv) FIG. 2N illustrates example formats for DFoNP, the corresponding STPI and an STPI frame which contain STPIs. STPI contains layer 2 02415 (including destination node identifier used for routing) protocol information. The DFoNP contains layer 2 02391, layers 3 02394 and layer 4 02394 protocol information. Frame Type in the frame gives the type of frame, Read Completion 02392 for DFoNP frame and Write 02402 for STPI frame. The STPI Frame contains the length of write 02403 (which is the length of STPI[1] 02404 and STPI[2] 02405) and address 02403 for the write. DFoNP contains Read Requester ID 02393 (Identifier) and a tag 02393 to identify the read request. DFoNP also contains address 02393 from which the layer 3/4 headers and the data 02395 is read and the length 02393 of the the read. The STPI Frame contains two STPIs and expanded view of the 2nd STPI (STPI[2]) 02405 is shown. STPI contains the node number 02411 and buffer address 02412 in the node to the location of the corresponding DFoNP and the length of the DFoNP 02416. These information are used to read the corresponding DFoNP. When DFoNP is transmitted to the next node, the node number 02411 and buffer address 02412 in STPI are updated. STPI also contains Source Node Number 02413, STPI Sequence Number 02414 and Miscellaneous 02416 information. The layer 2 header 02401 of the STPI frame contains next hop node address.

Figure 3E:
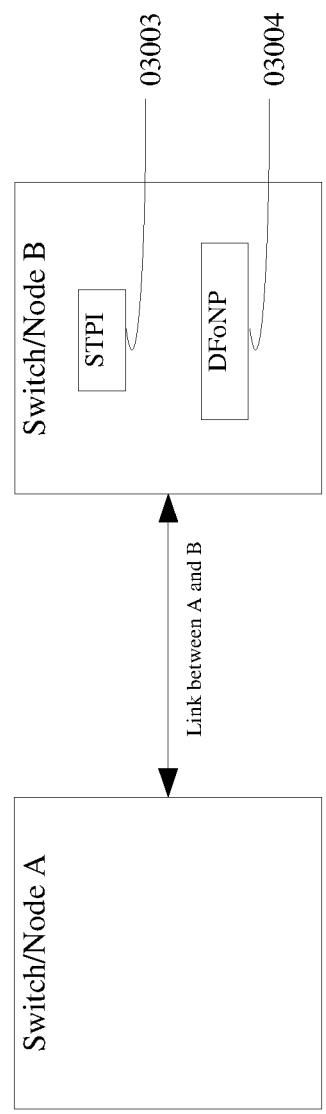
FIG. 3E illustrates the STPI being updated with the identifier of the Switch/Node B and the location of the DFoNP in the Switch/Node B.
Figure 4A:
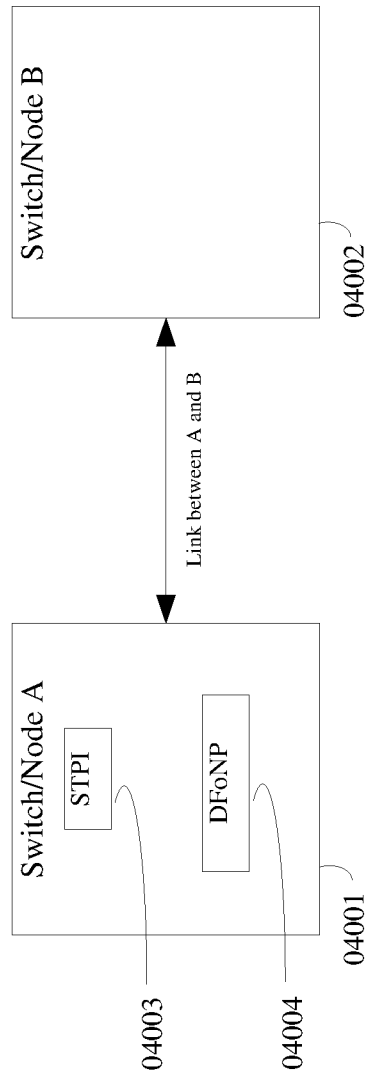
FIG. 4A illustrates Switch/Node A containing an STPI and the corresponding DFoNP to be transmitted to the Destination Node B.
Figure 4B:
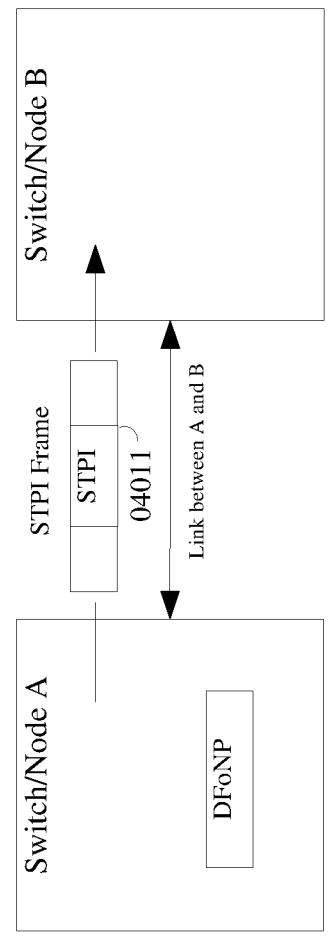
FIG. 4B illustrates the Switch/Node A transmitting an STPI Frame containing the STPI to the Switch/Node B.
Figure 5A:
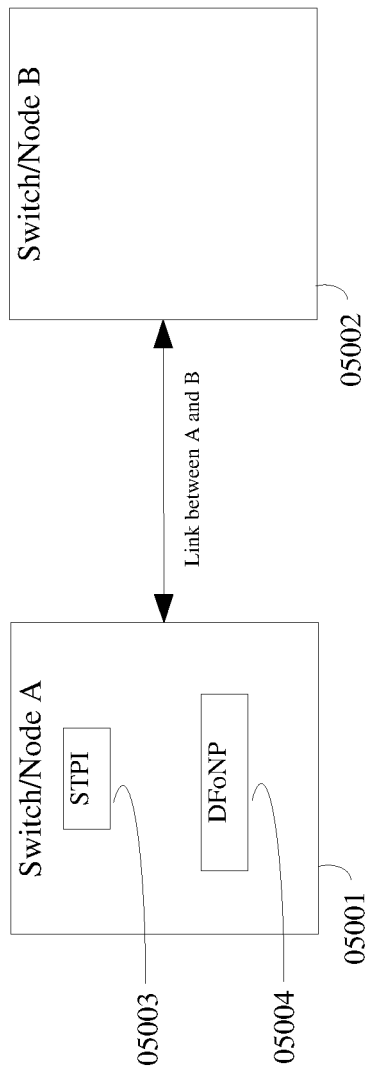
FIG. 5A illustrates Switch/Node A containing an STPI and the corresponding DFoNP to be transmitted to the Switch/Node B.
Figure 5B:
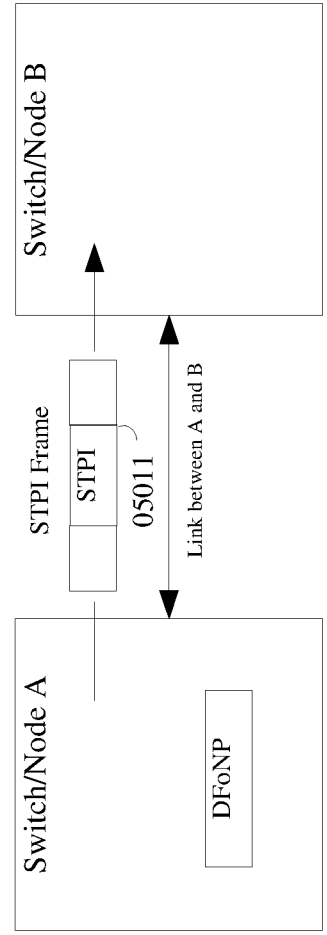
FIG. 5B illustrates Switch/Node A transmitting a frame containing the STPI to the Switch/Node B.
Figure 5C:
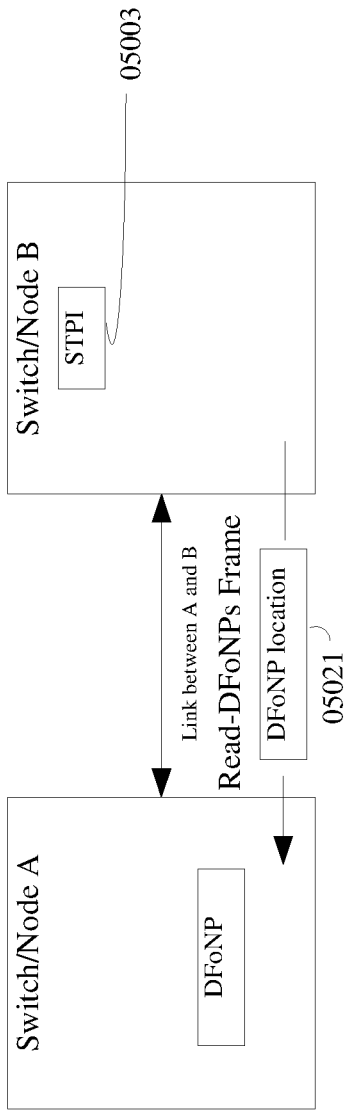
FIG. 5C illustrates the Switch/Node B deciding to fetch the DFoNP corresponding to the STPI and sending Read-DFoNP Frame to the Switch/Node A containing DFoNP request for the DFoNP.
Figure 5D:
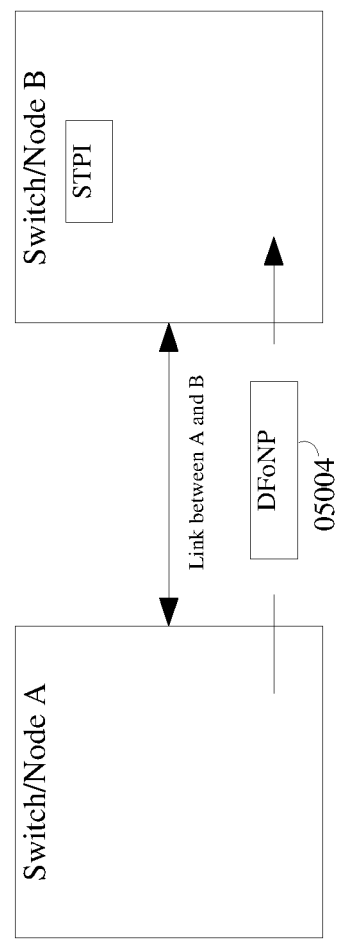
FIG. 5D illustrates the Switch/Node A responding to the Read-DFoNP request by transmitting the DFoNP.
Figure 5E:
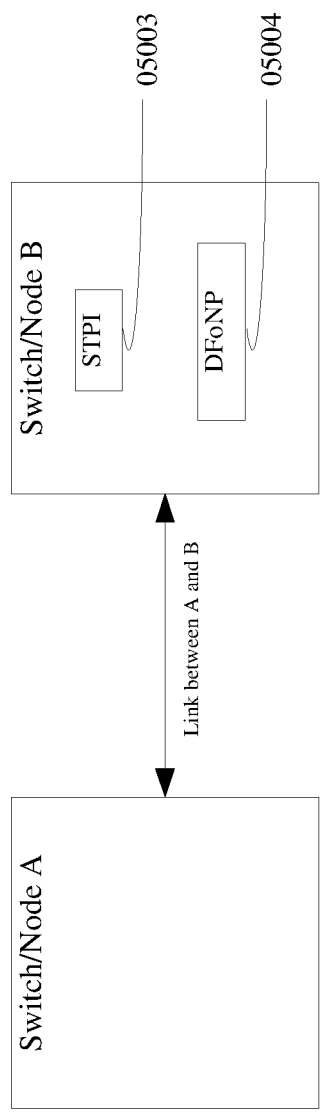
FIG. 5E illustrates the STPI being updated with identifier of Switch/Node B and the location of the corresponding DFoNP in the Switch/Node B.
Figure 6A:
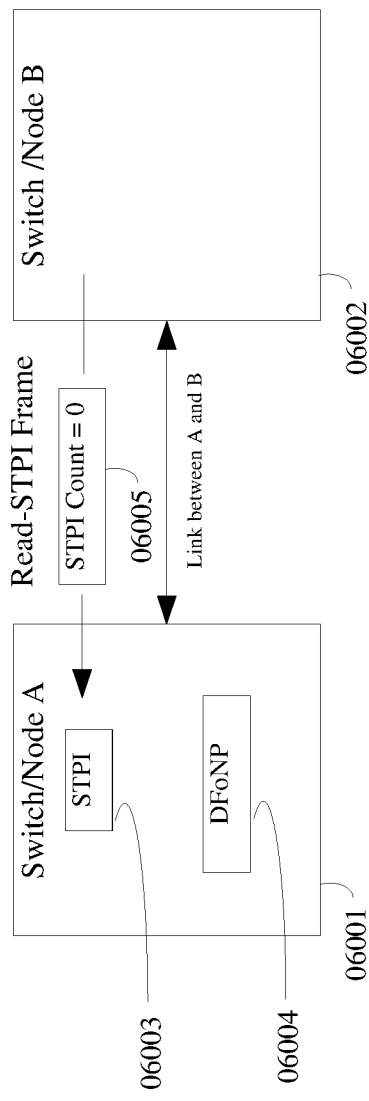
FIG. 6A illustrates Switch/Node A containing an STPI and the corresponding DFoNP to be transmitted to the Switch/Node B.
Figure 6B:
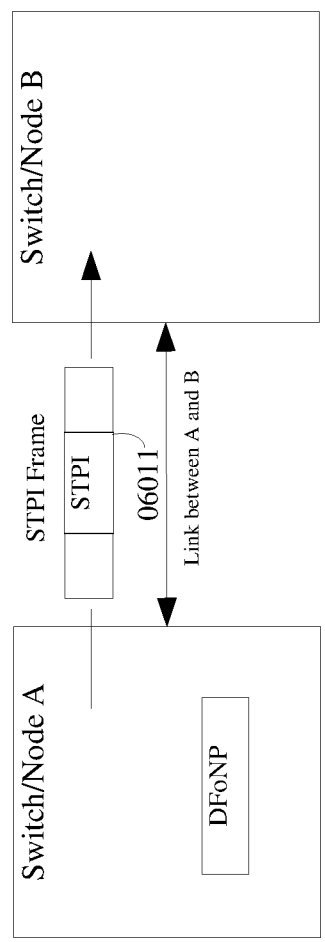
FIG. 6B illustrates the Switch/Node A responding by sending an STPI frame containing all STPIs to be transmitted to the Switch/Node B.
Figure 7A:
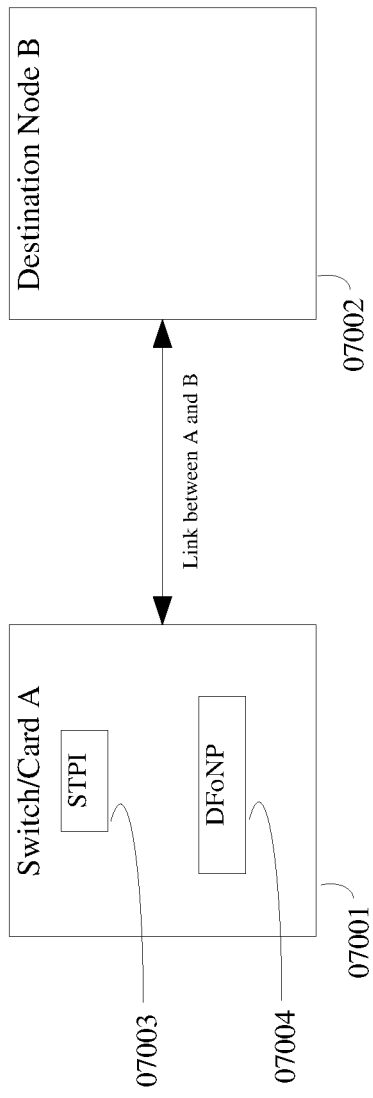
FIG. 7A illustrates Switch/Node A containing an STPI and the corresponding DFoNP to be transmitted to the Destination End Node B.
Figure 7B:
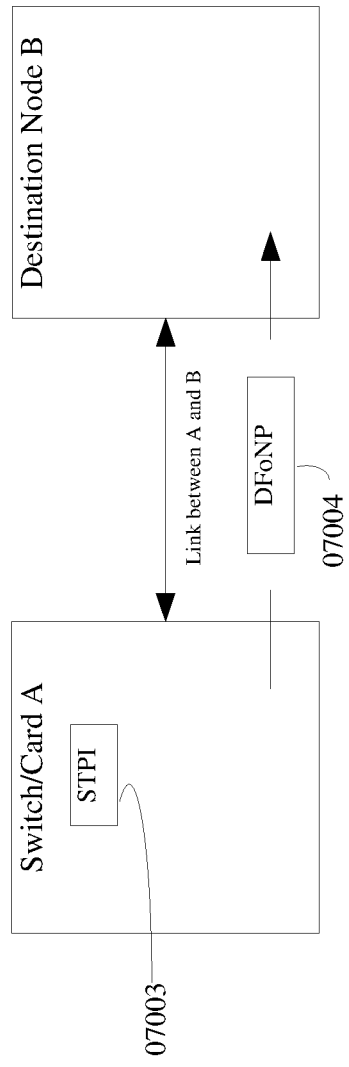
FIG. 7B illustrates Switch/Node A transmitting the DFoNP to the Destination End Node B and updating the STPI with the location (DMA address) of the DFoNP in the Destination End Node B.
Figure 7C:
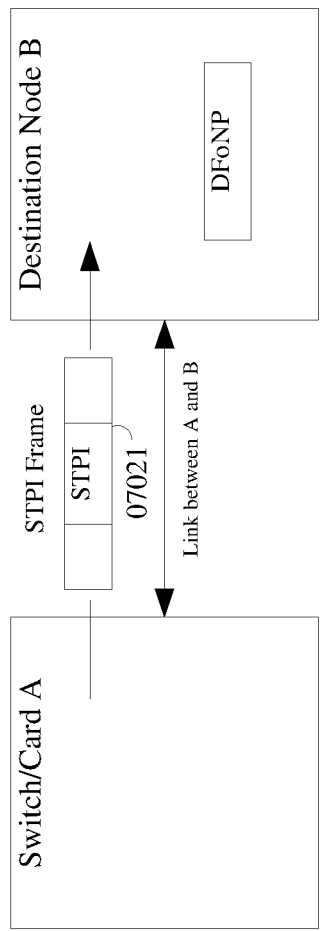
FIG. 7C illustrates Switch/Node A transmitting the STPI in an STPI frame to the Destination End Node B.
Figure 7D:
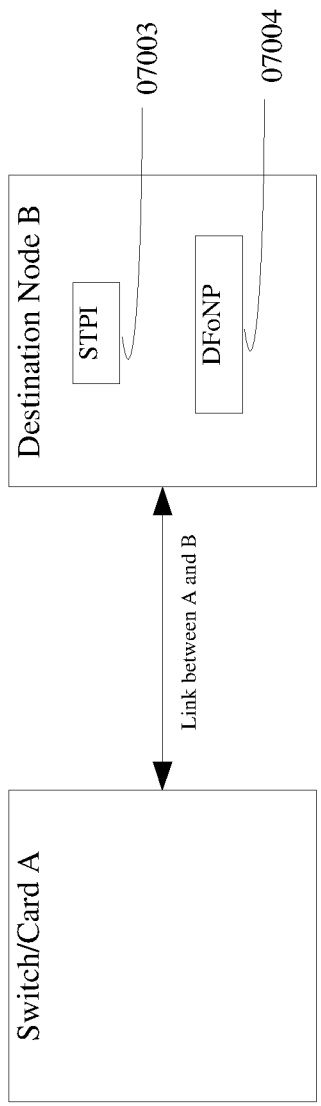
FIG. 7D illustrates that both STPI and DFoNP are received by End Node B.

Below five options for transferring STPI and the corresponding DFoNP from one node to another, are described. One of the first 4 methods can be used for transferring STPI and the corresponding DFoNP from the originating node or a switch to another switch or end node. The fifth method can be used for transferring STPI and the corresponding DFoNP to a destination end node:

i) FIG. 3A, FIG. 3B, FIG. 3C, FIG. 3D and FIG. 3E illustrate one of the options that could be used in a given network for transmitting STPI and DFoNP to the next hop node. In this option a switch/node responds to Read-STPI request by transmitting STPIs. The switch/node receiving STPIs sends Read-DFoNP requests using the information contained in STPIs to fetch the corresponding DFoNPs. A frame containing a Read-STPI request is called Read-STPI Frame. A frame containing Read-DFoNP requests is called Read-DFoNP Frame. In FIG. 3A, Switch/Node A 03001 contains an STPI 03003 and the corresponding DFoNP 03004 to be transmitted to the Switch/Node B 03002. In FIG. 3A, the Switch/Node B transmits Read-STPI Frame 03005 to the Switch/Node A giving the maximum number of STPIs that can be transmitted. The maximum number of STPIs 03005 are 5 in the example. In FIG. 3B, the Switch/Node A responds by sending an STPI frame 03011 containing the STPI 03003 (the STPI frame in this example can contain up to 5 STPIs). In FIG. 3C, the Switch/Node B decides to fetch the DFoNP corresponding to the STPI 03003 and sends Read-DFoNP Frame 03021 to the Switch/Node A containing the Read-DFoNP request for the DFoNP 03004. The Read-DFoNP request contains the location (a location could be a buffer address or an offset in a buffer or an index or a combination of addresses, offsets or indexes) of the DFoNP 03004 in the Switch/Node A. The location of the DFoNP to be used in Read-DFoNP request will be present or can be derived from the contents of the corresponding STPI 03003. In FIG. 3D, the Switch/Node A responds to the Read-DFoNP request for the DFoNP by sending the DFoNP 03004. In FIG. 3E, the STPI 03003 is updated with the identifier of the Switch/Node B and the location of the DFoNP 03004 in the Switch/Node B.

ii) FIG. 4A, FIG. 4B, FIG. 4C and FIG. 4D illustrate another option for transmitting STPI and the corresponding DFoNP to the next hop node. In this option, a switch/node transmits STPIs followed by DFoNPs corresponding to the STPIs transmitted. In FIG. 4A Switch/Node A 04001 contains an STPI 04003 and the corresponding DFoNP 04004 to be transmitted to the Destination Node B 04002. In FIG. 4B, the Switch/Node A transmits an STPI Frame 04011 containing the STPI 04003 to the Switch/Node B. In FIG. 4C, the Switch/Node A transmits the DFoNP 04004 to the Switch/Node B. In FIG. 4D, the Switch/Node B updates the STPI 04003 with the location of the DFoNP 04004 in the Switch/Node B.

iii) FIG. 5A, FIG. 5B, FIG. 5C, FIG. 5D and FIG. 5E illustrate another option for transmitting STPI and the corresponding DFoNP to the next hop node. In this option a switch/node transmits STPIs and the switch/node receiving STPIs sends Read-DFoNP requests using information contained in STPIs to fetch the corresponding DFoNPs. In FIG. 5A Switch/Node A 05001 contains an STPI 05003 and the corresponding DFoNP 05004 to be transmitted to the Switch/Node B 05002. In FIG. 5B Switch/Node A transmits a frame 05011 containing the STPI to the Switch/Node B. In FIG. 5C, the Switch/Node B decides to fetch the DFoNP corresponding to the STPI and sends Read-DFoNP Frame 05021 to the Switch/Node A containing DFoNP request for the DFoNP 05004. The DFoNP request contains the location of the DFoNP 05004. The location of the DFoNP used in the Read-DFoNP request will be present or can be derived from the contents of the corresponding STPI 05003. In FIG. 5D, the Switch/Node A responds to the Read-DFoNP request by transmitting the DFoNP 05004. In FIG. 5E, the STPI 05003 is updated with identifier of Switch/Node B and the location of the corresponding DFoNP 05004 in the Switch/Node B.

iv) FIG. 6A, FIG. 6B, FIG. 6C and FIG. 6D illustrate another option for transmitting STPI and DFoNP to the next hop node. In this option a switch/node responds to Read-STPI request by transmitting STPIs followed by the corresponding DFoNPs. In FIG. 6A Switch/Node A 06001 contains an STPI 06003 and the corresponding DFoNP 06004 to be transmitted to the Switch/Node B 06002. The Switch/Node B transmits Read-STPI Frame 06005 to the Switch/Node A giving the maximum number of STPIs that can be transmitted. The maximum number of STPIs 06005 is 0 in the example indicating that all STPIs can be transmitted. In FIG. 6B, the Switch/Node A responds by sending an STPI frame 06011 containing all STPIs to be transmitted to the Switch/Node B. In FIG. 6C, the Switch/Node A transmits the DFoNP 06004 corresponding to the STPI to the Switch/Node B. In FIG. 6D, the STPI 06003 is updated with identifier of the Switch/Node B and the location of the corresponding DFoNP 06004 in the Switch/Node B.

v) FIG. 7A, FIG. 7B, FIG. 7C, and FIG. 7D illustrate an option which can be used for transmitting DFoNP and optionally the corresponding STPI from a switch/node to a destination node: In this option DFoNP is transmitted to the destination node and then optionally, the corresponding STPI is transmitted. In FIG. 7A, Switch/Node A 07001 contains an STPI 07003 and the corresponding DFoNP 07004 to be transmitted to the Destination End Node B 07002. In FIG. 7B, Switch/Node A transmits the DFoNP 07004 to the Destination End Node B and updates the STPI 07003 with the location (DMA address) of the DFoNP in the Destination End Node B. In FIG. 7C, Switch/Node A transmits the STPI in an STPI frame 07021 to the Destination End Node B. In FIG. 7D, both STPI 07003 and DFoNP 07004 are received by End Node B.

A switch can employ one of the STPI and DFoNP transfer options (strategies) listed above, for each port. Both ports on a point-to-point link must agree to the same frame transmitting option. All ports on a link or bus must follow the same frame transmitting option. Preferably, a network employs only one of the four STPI/DFoNP transfer options listed in FIG. 3A to FIG. 3E, FIG. 4A to FIG. 4D, FIG. 5A to FIG. 5E, FIG. 6A to FIG. 6D. Preferably, a network also employs the STPI/DFoNP transfer option listed in FIG. 7A to FIG. 7D. For the option corresponding to FIG. 7A to FIG. 7D, updating STPI with address (location) of DFoNP in the end node is optional.

If DFoNPs do not contain information (such as originating node identifier, DFoNP identifier, DFoNP address in previous node, etc.) that allow a DFoNP to be mapped to the corresponding STPI, then the DFoNPs must be transmitted in the same order as requested in Read-DFoNP frame/s with design options listed in FIG. 3A to FIG. 3E and FIG. 5A to FIG. 5E. With design options listed in FIG. 4A to FIG. 4D and FIG. 6A to FIG. 6D, if DFoNPs do not contain information that allow the DFoNP to be mapped to the corresponding STPI, DFoNPs must be transmitted in the same order as the corresponding STPIs are transmitted. This will allow switches to identify STPI corresponding to an DFoNP that is received.

Figure 8A:
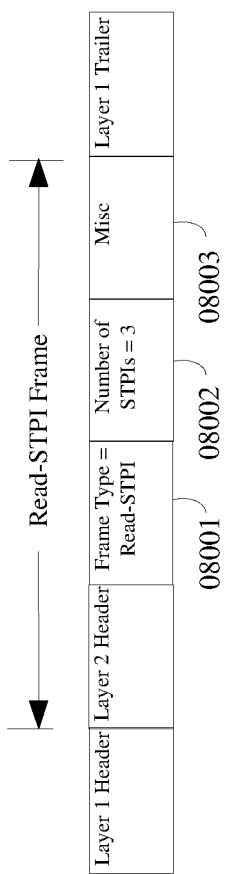
FIG. 8A illustrates a Read-STPI frame with Frame Type "Read-STPI" and "Number of STPIs" set to 3.
Figure 8B:
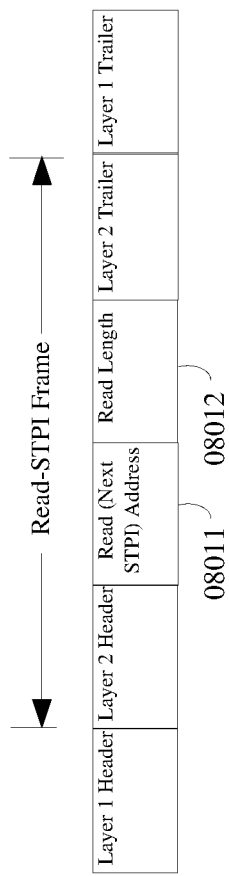
FIG. 8B illustrates a Read-STPI frame in a network where explicit frame type specification is not required.
Figure 8C:
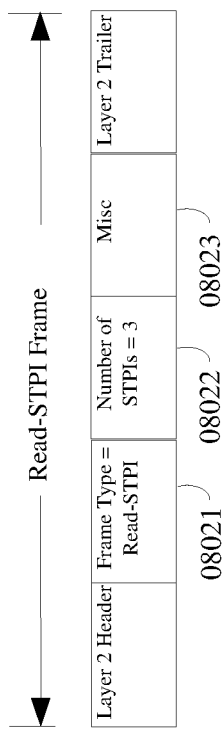
FIG. 8C illustrates a Read-STPI frame in a network without layer 1 headers or trailers.
Figure 8D:
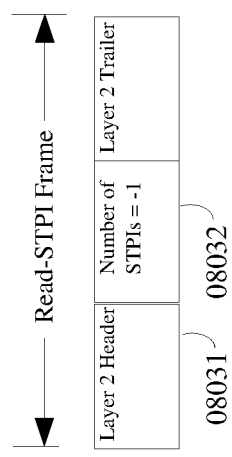
FIG. 8D illustrates a Read-STPI frame in a network without layer 1 headers or trailers.

There are a very large number of design options with network component designers with respect to the format of Read-STPI request and Read-STPI Frames containing Read-STPI request. FIG. 8A, FIG. 8B, FIG. 8C and FIG. 8D illustrate some examples of different formats in which the Read-STPI Frames can be created adhering to this invention. Preferably a given network employs only one format (design option) for Read-STPI request to keep the design of switches and end nodes simple.

i) FIG. 8A illustrates a Read-STPI frame with Frame Type "Read-STPI" 08001 and "Number of STPIs" 08002 set to 3. The frame also contains Miscellaneous 08003 field.

ii) FIG. 8B illustrates a Read-STPI frame in a network where explicit frame type specification is not required. The frame specifies an address 08011 for read (the location of the STPIs) in the node receiving the Read-STPI Frame. The frame also provides the length 08012 for read. The address where STPIs are stored can be dynamically configured on the switch for each node/switch it is connected to.

iii) FIG. 8C illustrates a Read-STPI frame in a network without layer 1 headers or trailers. Frame Type 08021 is "Read-STPI". The "Number of STPIs" 08022 is 0 indicating permission to transmit an STPI Frame with as many STPIs for the node transmitting Read-STPI Frame as possible, from the node receiving the Read-STPI Frame. The frame also contains a Miscellaneous 08023 field.

iv) FIG. 8D illustrates a Read-STPI frame in a network without layer 1 headers or trailers. Layer 2 header 08031 contains Frame Type (Read-STPI). The "Number of STPIs" 08032 is −1 indicating permission to transmit all STPIs for the node transmitting Read-STPI Frame, from the node receiving the Read-STPI Frame.

Figure 9A:
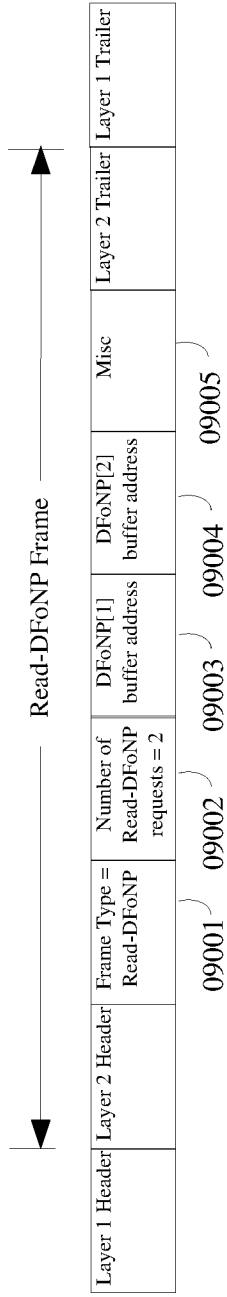
FIG. 9A illustrates a Read-DFoNP frame with Frame Type "Read-DFoNP" and "Number of Read-DFoNP requests" set to 2.
Figure 9B:
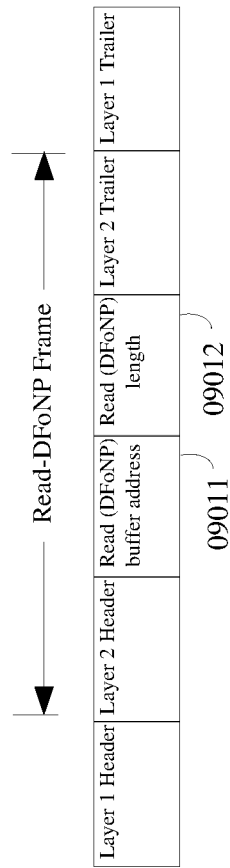
FIG. 9B illustrates a Read-DFoNP frame in a network where explicit frame type specification is not required.
Figure 9C:
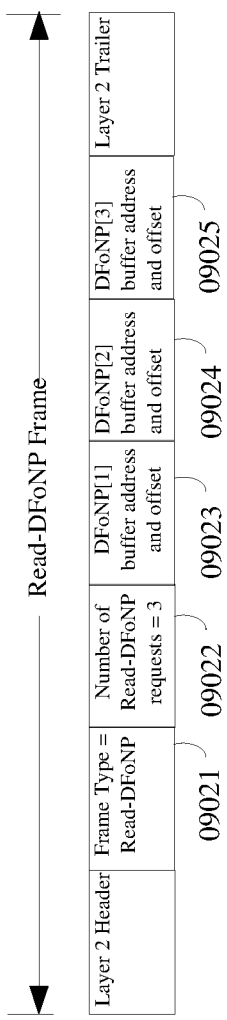
FIG. 9C illustrates Read-DFoNP frame in a network without layer 1 headers or trailers.
Figure 9D:
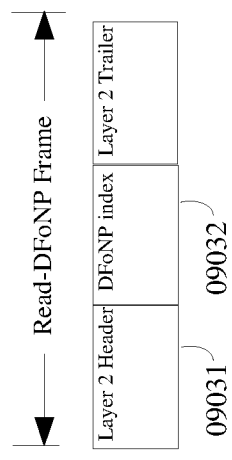
FIG. 9D illustrates a Read-DFoNP frame in a network without layer 1 headers or trailers.

A Read-DFoNP Frame contains one or more Read-DFoNP requests and each Read-DFoNP request contains the location of the requested DFoNP. There are a very large number of design options with network component designers with respect to the format of Read-DFoNP requests and Read-DFoNP Frames containing Read-DFoNP requests. FIG. 9A, FIG. 9B, FIG. 9C and FIG. 9D illustrate some examples of different formats in which the Read-DFoNP Frame can be created adhering to this invention. Preferably, a given network employs only one format (design option) for Read-DFoNP request to keep the design of switches and end nodes simple.

i) FIG. 9A, illustrates a Read-DFoNP frame with Frame Type 09001 "Read-DFoNP" and "Number of Read-DFoNP requests" 09002 set to 2. The DFoNP[1] 09003 and DFoNP[2] 09004 buffer addresses provide the location of the DFoNPs in the node receiving the Read-DFoNP Frame. The frame also contains Miscellaneous 09005 field.

ii) FIG. 9B illustrates a Read-DFoNP frame in a network where explicit frame type specification is not required. Frame specifies an address 09011 for read (the location of the DFoNP) in the node receiving the Read-DFoNP Frame. The frame also provides the length 09012 for read.

iii) FIG. 9C illustrates Read-DFoNP frame in a network without layer 1 headers or trailers. Frame Type 09021 is "Read-DFoNP", the "Number of Read-DFoNP requests" 09022 is 3. Each Read-DFoNP request contains a buffer address and an offset. The DFoNP[1] 09023, DFoNP[2] 09024 and DFoNP[3] 09025 buffer addresses and offsets provide the location of the DFoNPs in the node receiving the Read-DFoNP Frame.

iv) FIG. 9D illustrates a Read-DFoNP frame in a network without layer 1 headers or trailers. Frame Type (Read-DFoNP) is contained in layer 2 header 09031. Only one Read-DFoNP request 09032 is allowed in the frame and the the Read-DFoNP request gives the index of the DFoNP to be read.

Figure 10A:
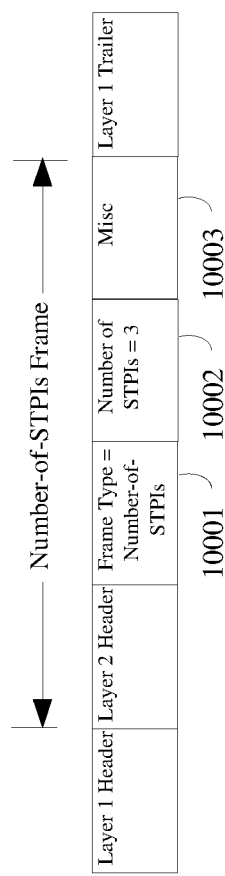
FIG. 10A illustrates a Number-of-STPIs frame with Frame Type "Number-of-STPIs" and "Number of STPIs" set to 3.
Figure 10B:
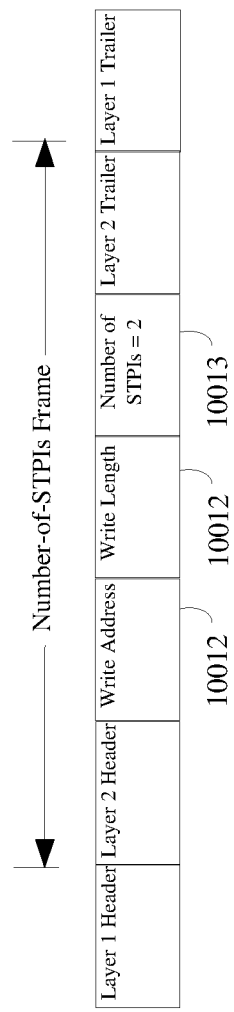
FIG. 10B illustrates Number-of-STPIs frame in a network where explicit frame type specification is not required.
Figure 10C:
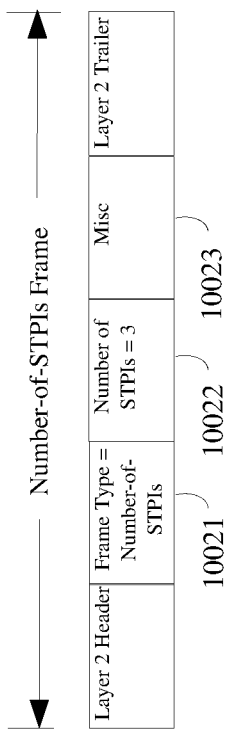
FIG. 10C illustrates Number-of-STPIs frame in a network without layer 1 headers or trailers.
Figure 10D:
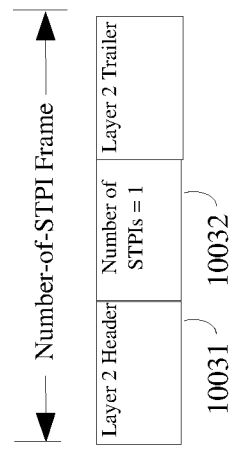
FIG. 10D illustrates a Number-of-STPIs frame in a network without layer 1 headers or trailers.

Optionally, a switch or node can send the number of STPIs available for transmission to the next hop node or switch. There are a very large number of design options with network component designers with respect to the format of Number-of-STPIs message and Number-of-STPIs Frames containing Number-of-STPIs message. FIG. 10A, FIG. 10B, FIG. 10C and FIG. 10D illustrate some examples of different formats in which the Number-of-STPIs Frame can be created adhering to this invention. Preferably a given network employs only one format for Number-of-STPI message to keep the design of switches and end nodes simple.

i) FIG. 10A, illustrates a Number-of-STPIs frame with Frame Type 10001 "Number-of-STPIs" and "Number of STPIs" 10002 set to 3. The frame also contains a Miscellaneous 10003 field.

ii) FIG. 10B illustrates Number-of-STPIs frame in a network where explicit frame type specification is not required. Frame specifies an address 10011 to the location where value of Number of STPIs will be written and the length 10012 of the field to be written. The next field contains data (Number of STPIs) 10013 for the write, which is 2.

iii) FIG. 10C illustrates Number-of-STPIs frame in a network without layer 1 headers or trailers. Frame Type 10021 is "Number-of-STPIs". The "Number of STPIs" 10022 is 3. The frame also contains a Miscellaneous 10023 field.

iv) FIG. 10D illustrates a Number-of-STPIs frame in a network without layer 1 headers or trailers. Layer 2 header 10031 contains Frame Type (Number-of-STPIs). The "Number of STPIs" 10032 is 1.

The network described in this invention can be connected to an I/O card (in a server or embedded system) or to a PCI bus.

i) The switch corresponding to this invention can be connected to an Ethernet card.

a) A recommended frame format for use with Ethernet is as follows:

1) Ethernet header contains destination MAC: The network can use next hop MAC address in the STPI/DFoNP/Read-STPI/Read-DFoNP/Number-of-STPIs frame.

2) Ethernet header contains source MAC address: A DFoNP frame can contain the MAC address of the originating node in this field. All other types of frames (STPI, Read-STPI, Read-DFoNP, Number-of-STPI) can contain MAC address of the node transmitting the frame in this field.

3) The Ethernet header contains length field as per Ethernet Protocol standard.

4) The first byte of the data field contains the "Frame-Type": one bit each for STPI, DFoNP, Read-STPI, Read-DFoNP and Number-of-STPIs.

5) Each STPI will contain the final destination MAC address. Optionally, each STPI can also contain source MAC address of the the originating node of the STPI.

6) The formats specified examples such as FIG. 2A, FIG. 2C etc., can be used with Ethernet.

Figure 11A:
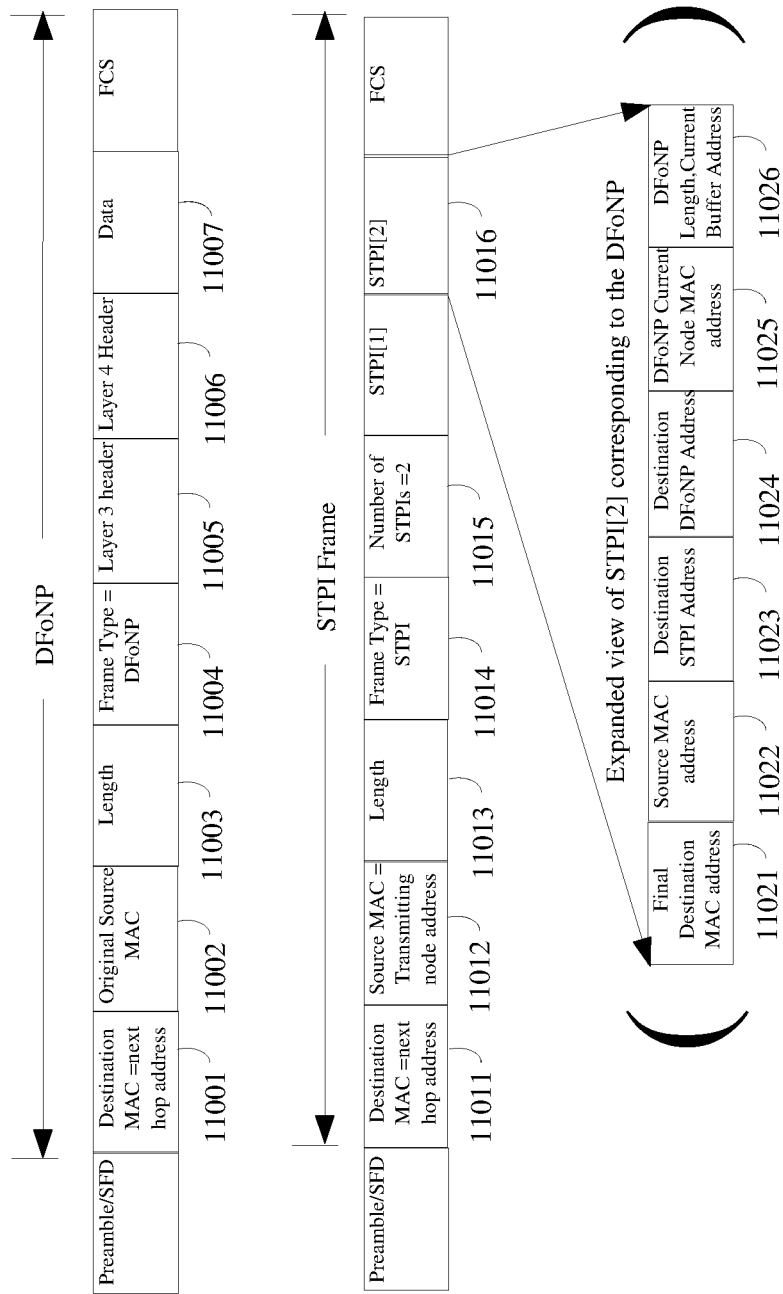
FIG. 11A illustrates an example of DFoNP and STPI frames which can be used with Ethernet.
Figure 11B:
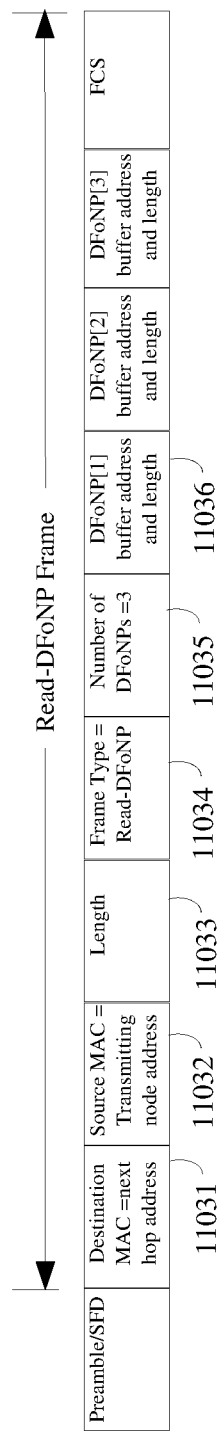
FIG. 11B illustrates Read-DFoNP frame which can be used with Ethernet.

7) The Ethernet trailer contains FCS for the frame.

b) FIG. 11A illustrates an example of DFoNP and STPI frames which can be used with Ethernet. FIG. 11B illustrates Read-DFoNP frame which can be used with Ethernet.

1) Destination MAC address 11001 in DFoNP frame is the MAC address corresponding to the port or node (next hop node) receiving the frame. If switches are designed to ignore Destination MAC address in a DFoNP frame, the final destination node MAC address could be used in the Destination MAC address field.

2) Source MAC address 11002 in the DFoNP frame is the MAC address of the node that created the DFoNP.

3) The length field 11003 provides the length as per Ethernet Protocol standard.

4) The first field in the data portion of Ethernet Frame is Frame Type 11004 and Frame Type of DFoNP frame is DFoNP (DFoNP bit is set).

5) The DFoNP contains layer 3 11005, layer 4 11006 protocol information and data 11007.

6) Destination MAC address 11011 in the STPI frame is the MAC address corresponding to the port or node (next hop node) receiving the frame.

7) Source MAC address 11012 in the STPI frame is the MAC address corresponding to the port transmitting the frame.

8) The length field 11013 provides the length as per Ethernet Protocol standard.

9) The first field in the data portion of the Ethernet Frame is Frame Type 11014 and Frame Type of STPI frame is STPI (STPI bit is set).

10) The STPI frame in this example contains 2 STPIs 11015.

11) Expanded view of the second STPI 11016 is shown.

12) Each STPI contains the Final Destination MAC address 11021 for the STPI and the corresponding DFoNP. Switches can use this address for routing.

13) The STPI contains the Source MAC Address 11022 of the Ethernet port through which the STPI entered the Ethernet LAN.

14) STPI contains "Destination STPI Address" 11023 which is the address to be used for RDMA Writing the STPI in the destination node.
15) STPI contains "Destination DFoNP Address" 11024 which is the address to be used for RDMA Writing the corresponding DFoNP in the destination node.
16) The STPI contains the MAC address of the node containing DFoNP 11025, buffer address 11026 of the DFoNP in this node and length 11026 of the DFoNP. These fields are used to create Read-DFoNP request.
17) After an STPI an STPI frame is received, the next hop node can initiate read for the corresponding DFoNP. FIG. 11B illustrates a Read-DFoNP frame containing 3 Read-DFoNP requests.
18) The destination MAC address 11031 in the Read-DFoNP frame is the "DFoNP Current Node MAC address" 11025 from the STPI.
19) The source MAC address 11032 in the Read-DFoNP frame is the MAC address corresponding to the port transmitting the Read-DFoNP Frame.
20) The length field 11033 provides the length as per Ethernet Protocol standard.
21) The first field in the data portion of the Ethernet Frame is Frame Type 11034 and Frame Type of Read-DFoNP frame is "Read-DFoNP" ("Read-DFoNP" bit is set).
22) The Number of DFoNPs 11035 being requested from the node receiving Read-DFoNP frame is 3 in this example.
23) The DFoNP buffer address 11036 and the length 11036 of DFoNP in Read-STPI frame are from DFoNP Current Buffer Address 11026 and DFoNP Length 11026 fields in STPI.

ii) If the switch corresponding to this invention is connected to a PCI bus, it behaves like an end node. The switch will use PCI transactions to communicate with the server.
  a) The host (in turn the PCI root bridge) can use PCI memory write transaction to transfer STPIs to a switch corresponding to this invention OR the switch can use PCI memory read transaction to read STPIs. The host can use PCI memory write transaction to write the address of the memory location holding STPIs which the switch can use for PCI Memory Read transaction.
  b) The switch can use PCI read transaction to read each DFoNP using the buffer address contained in the corresponding STPI.
  c) The host (in turn the PCI root bridge) can optionally use PCI write transaction to write the number of STPIs to a switch corresponding to this invention.
  d) The switch can use PCI memory write to write DFoNPs and STPIs to the memory of the destination node.
  e) FIG. 12A, FIG. 12B, FIG. 12C and FIG. 12D illustrate an example of transaction formats which can be used within PCI Express™ (PCI Express™ is a trade mark of PCI-SIG) transactions for transferring STPIs and DFoNPs from root bridge to a switch corresponding to this invention and vice versa.
    1) Example in FIG. 12A illustrates format of PCI Express Read Completion containing DFoNP, from a root bridge in response to a Memory Read request from a switch. The first field of PCI Express Read Completion data provides the Frame Type 12001 which is DFoNP. The rest of the Read Completion data is layer 3/4 protocol information 12002 and Data 12003 being transmitted to the remote node.
    2) Example in FIG. 12B illustrates format of PCI Express Read Completion containing STPIs, from a root bridge in response to a Memory Read request from a switch. The first field of data provides the Frame Type 12011 which is STPI. The second field in data is "Number of STPIs" 12012 which is 3 followed by three STPIs 12013. Each STPI contains "Final Destination Node Identifier" 12021 which is used by switches for routing, Source Node Identifier 12022 which is the identifier of the node that created the STPI, "Destination STPI Address" 12023 to be used for RDMA Writing STPI in the destination, "Destination DFoNP Address" 12024 to be used for RDMA Writing the corresponding DFoNP in the destination, "DFoNP Current Node ID" 12025, DFoNP Length and DFoNP Current Address 12026 to be used for reading DFoNP from the node where it is currently stored. The DFoNP Length field 12026 is also used for RDMAing DFoNP to the memory of the destination node.
    3) Example in FIG. 12C illustrates a PCI Express Memory Write transaction containing DFoNP, from a switch to a root bridge. The first field of PCI Express Memory Write transaction data provides the Frame Type 12031 which is DFoNP. The rest of the Read Completion data is layer 3/4 information 12032 and Data 12033 that arrived from the remote node.
    4) Example in FIG. 12D illustrates a PCI Express Memory Write transaction containing STPIs, from a switch to a root bridge. The first field of PCI Express Memory Write data provides the Frame Type 12041 which is STPI. The second field in the data is "Number of STPIs" 12042 which is 2 followed by two STPIs 12043. Each STPI contains "Final Destination Node Identifier" 12051 which is used by switch for routing, Source Node Identifier 12052 which is the identifier of the node that created the STPI, a miscellaneous field 12053, "DFoNP Current Node Identifier" 12054, DFoNP Current Buffer Address 12055 and DFoNP Length 12055 to be used for reading DFoNP from the node where it is currently stored. The DFoNP Length field 12055 is also used for doing PCI Express Memory Write transaction to the root bridge (DMAing DFoNP to the memory of the destination node). The DFoNP and STPI are DMAed into read buffers provided by the destination node.

When destination address contained in an STPI is a Multi-cast and Broadcast address, both STPI and DFoNP are transmitted to all next hop nodes identified by the Multi-cast or Broadcast address.

When STPI or DFoNP frames are corrupted or lost, switches and nodes may employ retransmission of the corrupted or lost frame. The retransmission policy and error recovery are link (example PCI) and vendor specific.

Figure 13A:
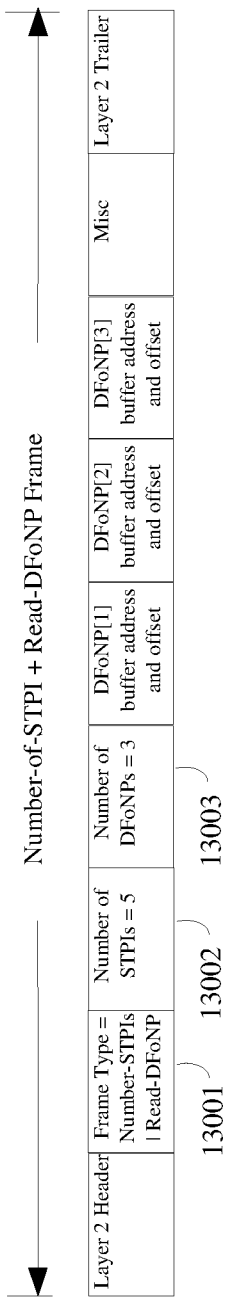
FIG. 13A illustrates a frame containing both Number-of-STPIs message and Read-DFoNP requests.
Figure 13B:
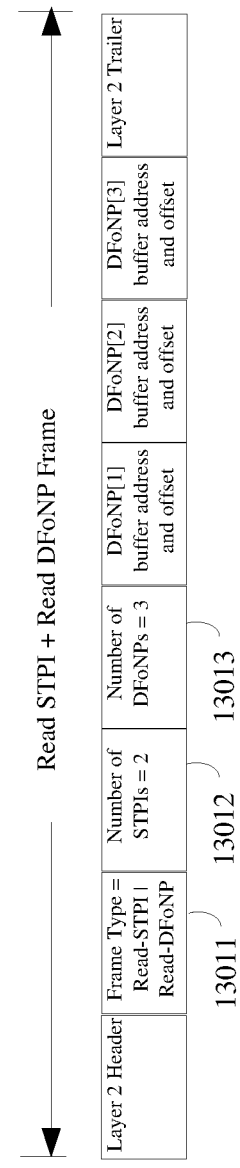
FIG. 13B illustrates a frame containing both Read-STPI request and Read-DFoNP requests.

Some networks allow more than one type of content to be present in the same frame. The types of contents are STPI, DFoNP, Read-STPI request, Read-DFoNP request and Number-of-STPIs message.

i) FIG. 13A illustrates a frame containing both Number-of-STPIs message and Read-DFoNP requests. The Frame Type 13001 is a bit-OR of "Number-of-STPIs" and "Read-DFoNP". The "Number of STPIs" 13002 is 5 indicating that there are 5 STPIs available to be transmitted to the receiving node. The "Number of DFoNPs" 13003 is 3 and the receiving node is expected to respond to the request by transmitting the three DFoNPs requested.

ii) FIG. 13B illustrates a frame containing both Read-STPI request and Read-DFoNP requests. The Frame Type 13011 is a bit-OR of "Read-STPI" and "Read-DFoNP". The "Number of STPIs" field 13012 is 2 and the "Number of DFoNPs" field 13013 is 3. The node receiving the frame is expected to respond with two STPIs and the three requested DFoNPs.

Figure 14A:
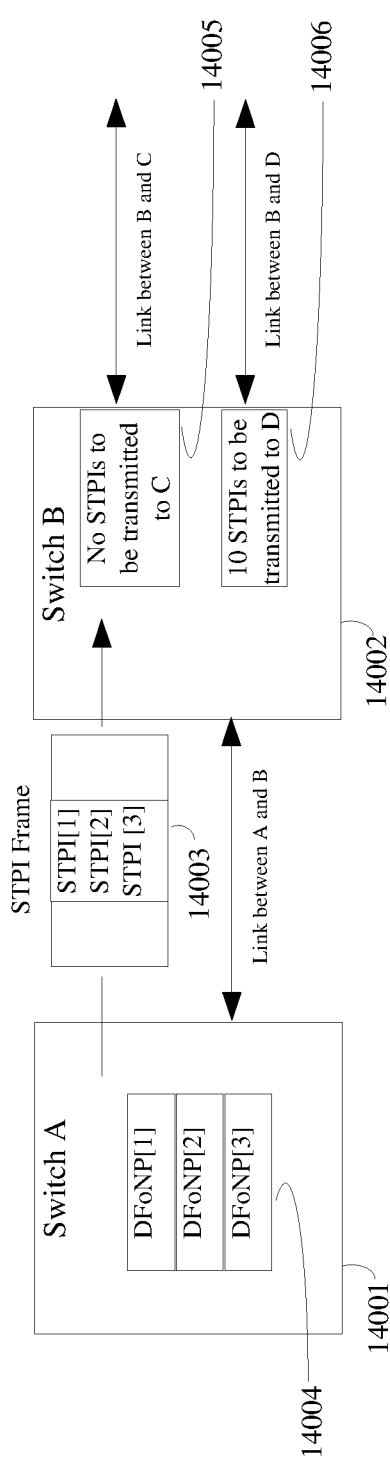
FIG. 14A illustrates Switch A has 3 DFoNPs to be transmitted to Switch B.
Figure 14B:
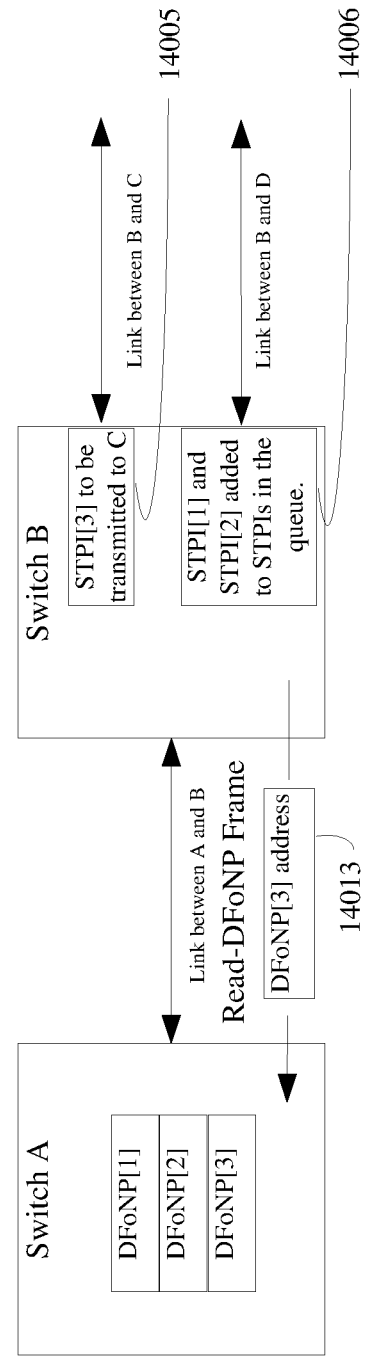
FIG. 14B illustrates the switch identifying that STPI[1] and STPI[2] received are for node D and adding STPI[1] and STPI[2] to the queue for the node D.

FIG. 14A and FIG. 14B illustrate an example of reading DFoNPs in a different order compared to the order in which STPIs are received. In FIG. 14A, Switch A 14001 has 3 DFoNPs 14004 to be transmitted to Switch B 14002. The Switch A forwards 3 STPIs corresponding to the DFoNPs in an STPI frame 14003 to Switch B. The Switch B has 10 STPIs in its queue 14006 for its link to node D. The switch B has no STPIs in its queue 14005 for its link to node C. In FIG. 14B, the switch identifies that STPI[1] and STPI[2] received are for node D and adds STPI[1] and STPI[2] to the queue 14006 for the node D. The Switch B delays reading DFoNP[1] and DFoNP[2] since there are a large of STPIs already queued for the node D. The Switch B identifies that STPI[3] received is for the node C and queues STPI[3] to the queue 14005 for the node C. The Switch B sends Read-DFoNP Frame 14013 to the Switch A with DFoNP[3] address.

If STPI contains a priority or QoS field, a switch can use it for controlling the order in which DFoNPs are read. Similarly, a priority or QoS field in STPI or DFoNP could be used by switches or nodes to control the order in which STPIs are transmitted to the next node.

A network corresponding to this invention could be used to connect a server or servers to storage devices (such as disks, disk arrays, JBODs, Storage Tapes, DVD drives etc.). iSCSI and iSER (iSCSI Extensions for RDMA) are examples in which SCSI commands and SCSI data are transmitted using networks technologies used for server interconnect.

Advantages

A switch can delay receiving DFoNP for paths which are already congested.

A switch can read DFoNP corresponding to a lightly loaded link ahead of other DFoNPs and transmit STPI and DFoNP more quickly to the lightly loaded link improving link efficiency.

A switch can delay reading DFoNPs based on QoS or priority field in STPI.

A switch can optimize switch resources, memory and frame/packet queues as congestions are minimized by delaying DFoNPs for ports which are already congested.

The switch can ensure higher throughput on all links by rearranging order in which DFoNPs are read.

What is claimed is:

1. A method implemented in a first network apparatus used for forwarding data link frames, wherein said first network apparatus is used for interconnecting network nodes in a network, said method comprising:
    a) receiving a first request;
    b) responding to said first request by transmitting at least one first data link frame to a second network node before transmitting a second data link frame to said second network node, wherein a set of data link frames received by said first network apparatus comprises said at least one first data link frame and said second data link frame, wherein said at least one first data link frame and said second data link frame are transmitted from a network port in said first network apparatus to said second network node; and
    c) transmitting data link frames in said set of data link frames in a first order different from a second order in which data link frames in said set of data link frames were received by said first network apparatus.

2. The method of claim 1, wherein said first request is received from said second network node.

3. The method of claim 1, wherein said second network node transmitting said first request to said first network apparatus to lower congestion in the network.

4. The method of claim 1, wherein said first request comprising number of data link frames in said set of data link frames to be transmitted by said first network apparatus to said second network node when said first request is received.

5. The method of claim 3 further comprising:
    a) receiving a second request; and
    b) transmitting a third data link frame to said second network node when said second request is received.

6. The method of claim 3, wherein said first request is received in a fourth data link frame.

7. The method of claim 1 further comprising: said first network apparatus receiving priority of a fifth data link frame before receiving said fifth data link frame, wherein said priority is used to delay said receiving of said fifth data link frame.

8. A method implemented in a first network apparatus used for forwarding network packets, wherein said first network apparatus is used for interconnecting network nodes in a network, said method comprising:
    a) receiving a first request;
    b) responding to said first request by transmitting at least one first network packet to a second network node before transmitting a second network packet to said second network node, wherein a set of network packets received by said first network apparatus comprises said at least one first network packet and said second network packet, wherein said at least one first network packet and said second network packet are transmitted from a network port in said first network apparatus to said second network node; and
    c) transmitting network packets in said set of network packets in a first order different from a second order in which network packets in said set of network packets were received by said first network apparatus.

9. The method of claim 8, wherein said first request is received from said second network node.

10. The method of claim 8, wherein said second network node transmitting said first request to said first network apparatus to lower congestion in the network.

11. The method of claim 8, wherein said first request comprising number of network packets in said set of network packets to be transmitted by said first network apparatus to said second network node when said first request is received.

12. The method of claim 10 further comprising:
    a) receiving a second request; and b) transmitting a third network packet to said second network node when said second request is received.

13. The method of claim 10, wherein said first request is received in a data link frame.

14. The method of claim 8 further comprising: said first network apparatus receiving priority of a fourth network packet before receiving said fourth network packet, wherein said priority is used to delay said receiving of said fourth network packet.

15. A method implemented in a first network apparatus used for forwarding data link frames, wherein said first network apparatus is used for interconnecting network nodes in a network, said method comprising:
   a) receiving a first data link frame;
   b) receiving at least one second data link frame;
   c) receiving a first request; and
   d) responding to said first request by transmitting said at least one second data link frame to a second network node before transmitting said first data link frame to said second network node, wherein said first data link frame and said at least one second data link frame are transmitted from a network port in said first network apparatus to said second network node, wherein said at least one second data link frame and said first data link frame are to be transmitted out of said second network node.

16. The method of claim 15, wherein said first request is received from said second network node.

17. The method of claim 15, wherein said second network node transmitting said first request to said first network apparatus to lower congestion in the network.

18. The method of claim 15, wherein said first request comprising number of data link frames to be transmitted by said first network apparatus to said second network node when said first request is received.

19. The method of claim 17 further comprising:
   a) receiving a second request; and
   b) transmitting a third data link frame to said second network node when said second request is received.

20. The method of claim 17 further comprising: said first network apparatus receiving priority of a fourth data link frame before receiving said fourth data link frame, wherein said priority is used to delay said receiving of said fourth data link frame.

\* \* \* \* \*